US012412026B2

(12) United States Patent
Gupta et al.

(10) Patent No.: US 12,412,026 B2
(45) Date of Patent: Sep. 9, 2025

(54) MAINTAINING TIME RELEVANCY OF STATIC CONTENT

(71) Applicant: Adeia Guides Inc., San Jose, CA (US)

(72) Inventors: Vikram Makam Gupta, Karnataka (IN); Vishwas Sharadanagar Panchaksharaiah, Tumkur District (IN); Gyanveer Singh, Bihar (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/391,548

(22) Filed: Aug. 2, 2021

(65) Prior Publication Data

US 2023/0030370 A1     Feb. 2, 2023

(51) Int. Cl.
*G06F 40/166*     (2020.01)
*G06F 16/23*      (2019.01)

(52) U.S. Cl.
CPC ........ *G06F 40/166* (2020.01); *G06F 16/2379* (2019.01)

(58) Field of Classification Search
CPC .................................................... G06F 40/166
See application file for complete search history.

(56) References Cited

U.S. PATENT DOCUMENTS

| | | | | |
|---|---|---|---|---|
| 9,179,061 B1 * | 11/2015 | Kraft et al. | ........ | H04N 5/23222 |
| 9,286,526 B1 * | 3/2016 | Manhar | .............. | G06K 9/00852 |
| 10,198,152 B2 * | 2/2019 | Lewis et al. | .......... | G06F 3/0484 |
| 2004/0073484 A1 * | 4/2004 | Camporeale et al. | .. | G06F 17/60 |
| 2013/0232015 A1 * | 9/2013 | Watanabe et al. | ..... | G06Q 30/02 |
| 2014/0169767 A1 * | 6/2014 | Goldberg | ............. | G11B 27/031 |
| 2015/0095320 A1 * | 4/2015 | Motte | ................. | G06F 17/3053 |
| 2016/0364397 A1 * | 12/2016 | Lindner et al. | ..... | G06F 17/3089 |
| 2018/0239832 A1 * | 8/2018 | Galuten | ............ | G06F 17/30867 |
| 2018/0308524 A1 * | 10/2018 | Muyal et al. | .......... | G11B 27/34 |
| 2020/0151503 A1 * | 5/2020 | Wang et al. | ......... | G06K 9/6256 |
| 2021/0204006 A1 * | 7/2021 | Lee et al. | ......... | H04N 21/23424 |
| 2022/0005477 A1 * | 1/2022 | Ma et al. | ................ | G10L 15/26 |

* cited by examiner

*Primary Examiner* — James J Debrow
(74) *Attorney, Agent, or Firm* — Haley Guiliano LLP

(57) ABSTRACT

Static content, such as text, an audio clip, an image, or a video clip, may be forwarded to users in a communication, e.g., a message, e-mail, social media post, social chat message, or made available in a blog post, or webpage. It is determined whether time-sensitive information included in that content will be updated automatically. If so, then updated information is obtained, and used to modify the time-sensitive information, e.g., by replacing and/or supplementing the time-sensitive information. If it is not determined that the time-sensitive information will be updated automatically, then the content may be modified by adding an indication that the time-sensitive information is, or may be, outdated, or removing the time-sensitive information from the content. The unmodified content may, optionally, be forwarded to the other users together with the modified content. Feedback from the other users may be used to inform future content modifications.

22 Claims, 17 Drawing Sheets

MAINTAINING TIME RELEVANCY OF STATIC CONTENT

FIELD

The present disclosure is directed to methods and systems that allow users to consume static content, and, more particularly, to methods and systems for maintaining time relevancy of such content.

BACKGROUND

Many messaging and social chat services allow users to create or forward media clips and make them available to other users. Those other users might not view the clip immediately. Indeed, there are various reasons why a user might not access media content included in a message, post or webpage until a considerable time has elapsed after its creation. For example, a first user may send a message forwarding media content to another user, and the other user might not open the message for some time. In another example, the first user may include such media content in a post on a social media network, and the second user might read that post days, weeks or months later. Where the clip includes information that is time-sensitive, such as a sports score or news story, the clip may lose its relevancy and/or become outdated by the time it is consumed by the second user. Such a loss of relevancy due to delays in consuming the content would be exacerbated if the second user were to repost the content or forward the content to other users. The presentation of such irrelevant or outdated information might confuse, inconvenience, or even mislead the second user and any other users to whom the second user forwards the content, particularly if it is not clear that the clip was created some time ago.

SUMMARY

According to one aspect, there is provided a method comprising accessing static media content and analyzing the content to identify time-sensitive information. The content may be static content to be made available to other users in, for example, a message, such as a Multimedia Messaging Service message, iMessage®, social chat message or e-mail. Alternatively, the content may be being made available in a post, for example, a post accessible via a social media network, a blog post or a webpage. In yet another example, the content may be content that has been received from such a message or e-mail or accessed through a social media network, blog or webpage.

The content may be an audio clip or video clip. The time-sensitive information may be one or more of: text data; audio data; or video data included in the content.

The time-sensitive information may be identified by parsing the content to identify keywords relating to times, dates or time periods embedded in text, audio or video data of the content. For example, audio data in the content may be analysed using speech recognition to identify spoken words such as "today," "tomorrow," "latest," "next week," references to specific times, days or dates that imply time-sensitivity. Similarly, metadata and/or closed caption data may be parsed to identify such words. Text recognition may be performed on video data of the content to identify such words, times or dates. Any of these recognition techniques may be combined with natural language processing techniques to identify the time-sensitive information.

The method further comprises determining whether an updated version of the time-sensitive information is available. For example, an updated version of the time-sensitive information may be obtainable from a fact-checking service or other official service. Where the time-sensitive information is a sports statistic, an updated statistic may be provided by, or derivable from information obtainable from, a fact-checking service, reputable news service or a relevant sports regulatory body. In another example, the time-sensitive information may include weather information that can be updated using information from a meteorological service.

Optionally, a level of confidence associated with the updated version may be determined. The level of confidence may be based on a reliability score associated with the content source providing the updated version of the time-sensitive information. For example, a webpage that is part of an official website of a sports team may have a higher reliability score and, therefore, a higher level of confidence associated with it, than a post on a fan forum for that team.

Alternatively, or additionally, the level of confidence may be based on the type of time-sensitive information. For example, an updated version of quantifying information may have a higher level of confidence than an updated version of qualifying information. In other words, if the identified time-sensitive information is numerical in nature, such as a temperature, statistic or sports score, or a statement that a particular quantity is increasing or decreasing, then an updated version of the time-sensitive information may have a high level of confidence in its accuracy, relative to qualitative information, such as an opinion or prediction that a future event is "likely" to occur.

A determination as to whether the content is to be modified may be based on the level of confidence. For example, if the level of confidence does not meet a predetermined level of confidence, then the content may be presented without modification, or with a notification that the content may include outdated information. If the level of confidence meets the predetermined level of confidence, then the content may be modified by adding an indication of the updated version to the content.

Alternatively, or additionally, a determination of a type of modification to be made may be based on a second level of confidence associated with the updated version. For example, if the second level of confidence meets or exceeds a second predetermined level of confidence, the content may be modified by replacing the time-sensitive information with the updated version and, optionally, a notification that the content has been modified. If the second level of confidence does not meet the second predetermined level of confidence, then a different modification may be applied, such as adding a notification that the time-sensitive information might be outdated or, alternatively, removing the time-sensitive information from the content and adding a notification of that removal.

In methods and systems in which a notification is added to the content, the notification may include an audio notification, and/or a visual indication, such as an icon or text.

In some examples, a notification that the content has been modified may be omitted from the modified content, in order to provide users accessing the modified content with a seamless viewing experience.

When a user attempts to access the modified content, a prompt may be presented to provide to the user with an option to select either the unmodified content or the modified content for viewing.

Optionally, the content may include a flag, such as a metadata field, indicating whether modification of the content is allowed. For instance, where the communication was posted or forwarded by a user wishing to make a joke or voice an opinion, that user may add a setting to the content to prevent the modifications being made automatically.

The content may be forwarded with a facility for the other users to provide feedback on the success of the modification. The feedback may be used to inform future modifications of content, adjust a model or one or more levels of confidence used to determine whether or not a modification is to be made automatically, and/or a type of modification to be made.

It should be noted that the systems and/or methods described above may be applied to, or used in accordance with, other systems and/or methods.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems in accordance with the present disclosure access static media content, and identify time-sensitive information included in the content, such as information that may have superceded or become outdated. The content 104 may comprise any of text, image, audio or video data that is to be, or has been, forwarded in a message or social media post, blog post or webpage. The content may be parsed to identify time- or date-related references in image data, video data, text data, audio data or metadata. Natural language processing techniques may be employed in the identification of time- or date-related references. Instead of, or in addition to, the identification of time- and date-related references, information about a subject or genre of the content may be used to determine whether time-sensitive information is present.

Figure 1:
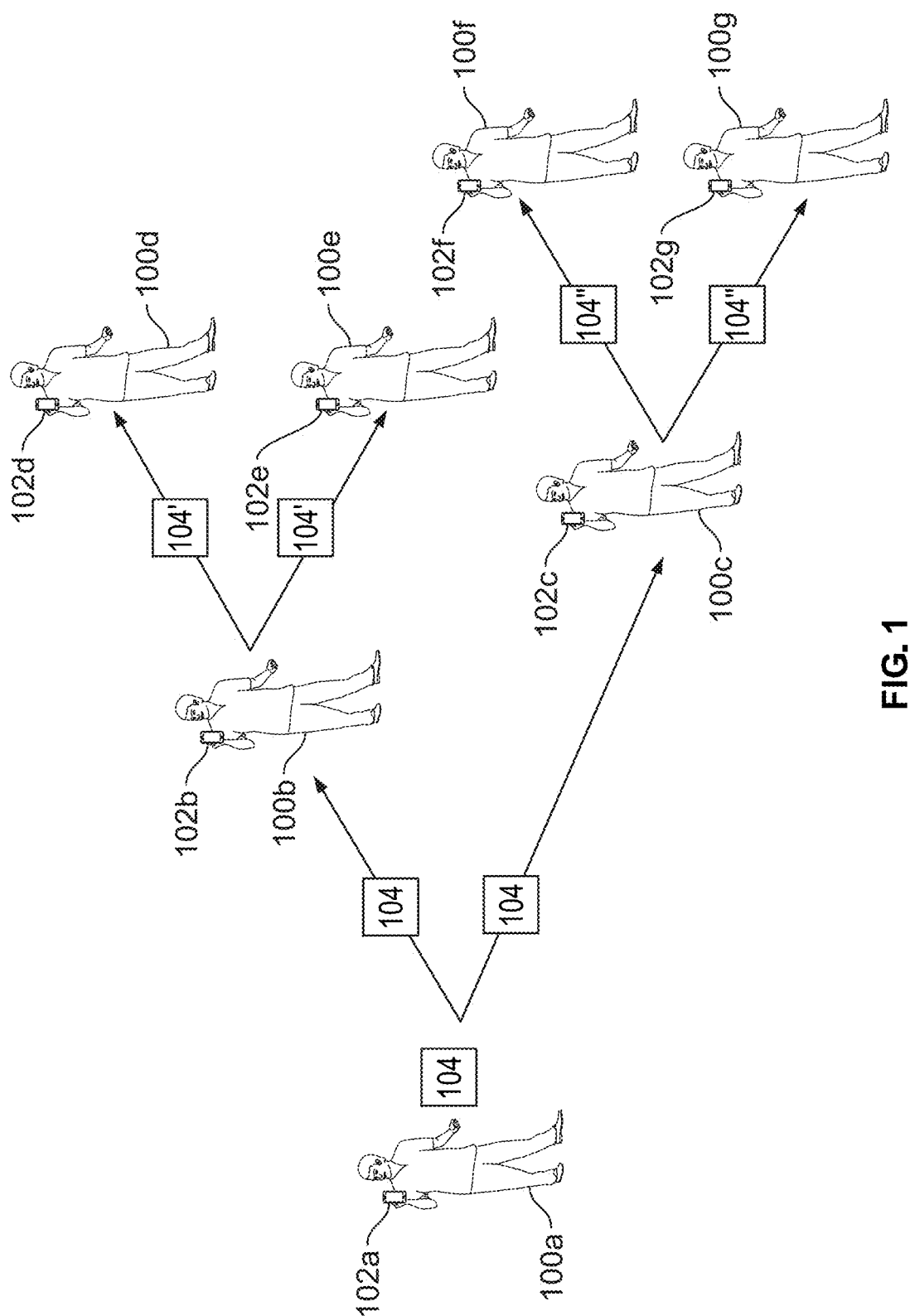
FIG. 1 depicts an example scenario in which content is forwarded by one user to another, according to an embodiment.

FIG. 1 depicts an example scenario in which a first user 100a uses a first user equipment device 102a to forward content 104 to other users 100b, 100c at a first time t1. The content 104 may be, for example, text, image, audio or video data forwarded in a message or social media post from the first user 100a that is subsequently accessed by user equipment devices 102b, 102c.

Figure 2:
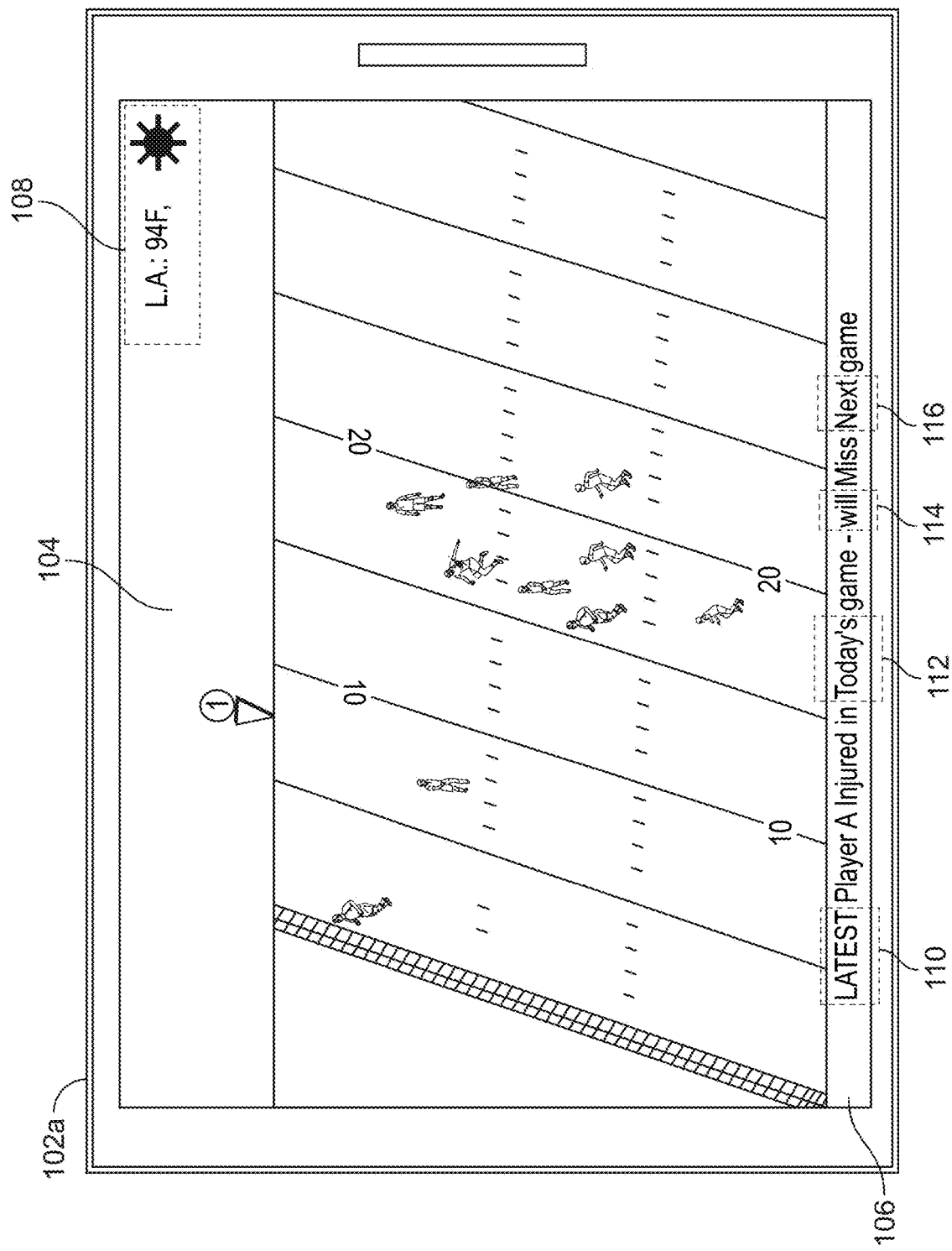
FIG. 2 depicts a display of the content forwarded by a first user of the users of FIG. 1.

In this particular example, the content 104 is a video clip of a football game. FIG. 2 depicts a display of the content 104 on the user equipment device 102a of the first user 100a. As shown in FIG. 2, the content 104 includes a number of instances of time-sensitive information. For example, the content 104 includes a banner 106 displaying a statement that refers to an event in the game, a player injury, and a future event, that player missing the next game in their team's schedule. The content 104 also includes a weather forecast 108. In this example, the time-sensitive information is in text form. In other examples, however, the content may include time-sensitive information in any one or more of text, video data, or audio data.

In this particular example, the second user 100b instructs a user equipment device 102b to forward the content 104 to users 100d, 100e at time t2, and the third user 100c instructs a user equipment device 102c to forward the content 104 to users 100f, 100g at a later time t3. The second and third users 100b, 100c might not have accessed the forwarded content 104 immediately. In particular, where the content 104 is forwarded in a social media post, the second and third users 100b, 100c might not see the post until they access a social media network application. The second and third users 100b, 100c might decide to forward the content to the other users 100d, 100e, 100f, 100g at any time after that. A considerable period of time may elapse between the first user 100a forwarding the content 104 at time t1, and the second and third users 100b, 100c forwarding the content at time t2 and time t3, respectively, during which certain portions of the content, such as the wording "LATEST" 110, the reference to "today's game," the statement that the player "will miss" the "next game," and the weather forecast 108 may no longer be current.

Figure 3:
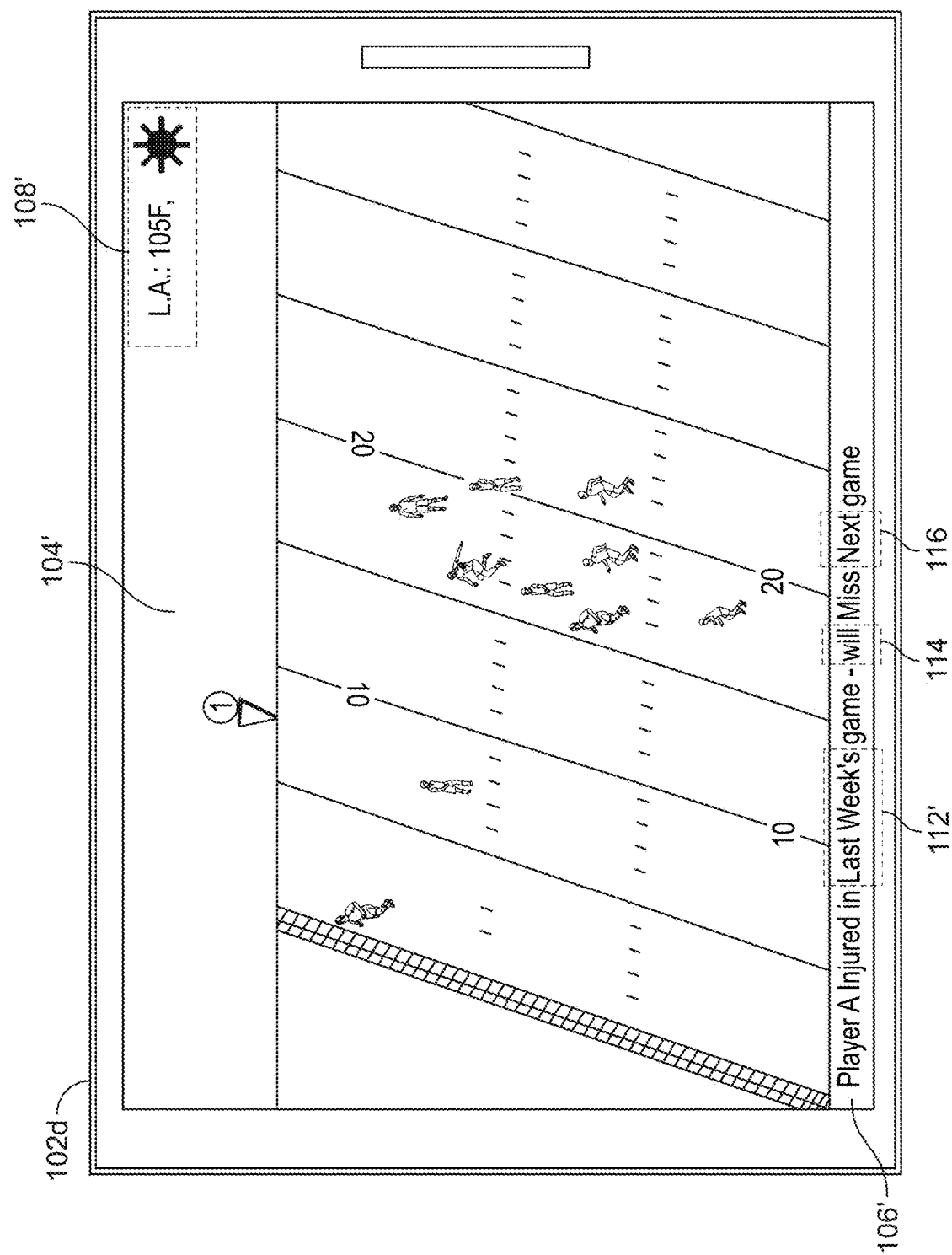
FIG. 3 depicts a display of an example of a modified version of the content in the scenario of FIG. 1.

FIG. 3 depicts an example of a display of modified content 104' on user equipment device 102d of user 100d. In this example, the modified content 104' includes a modified banner 106', in which the word "LATEST" 110 has been removed, and the word "today's" 112 in "today's game" has been replaced with the wording "last week's" 112', to reflect the time that has elapsed between time t1 and time t2. Also, the weather forecast 108 has been replaced with an updated weather forecast 108'. The statement that the player will miss the next game has not been updated. Therefore, the time-related wording "will" 114 and "next" 116 in that statement are unchanged.

In the example shown in FIG. 3, the modified content 104' does not include a notification that the content has been modified, so that the changes appear seamless to the user 102*d*. In other examples, a notification that the content has been modified may be provided, in the form of a visual notification, such as text or an icon, and/or an audio notification.

Figure 4:
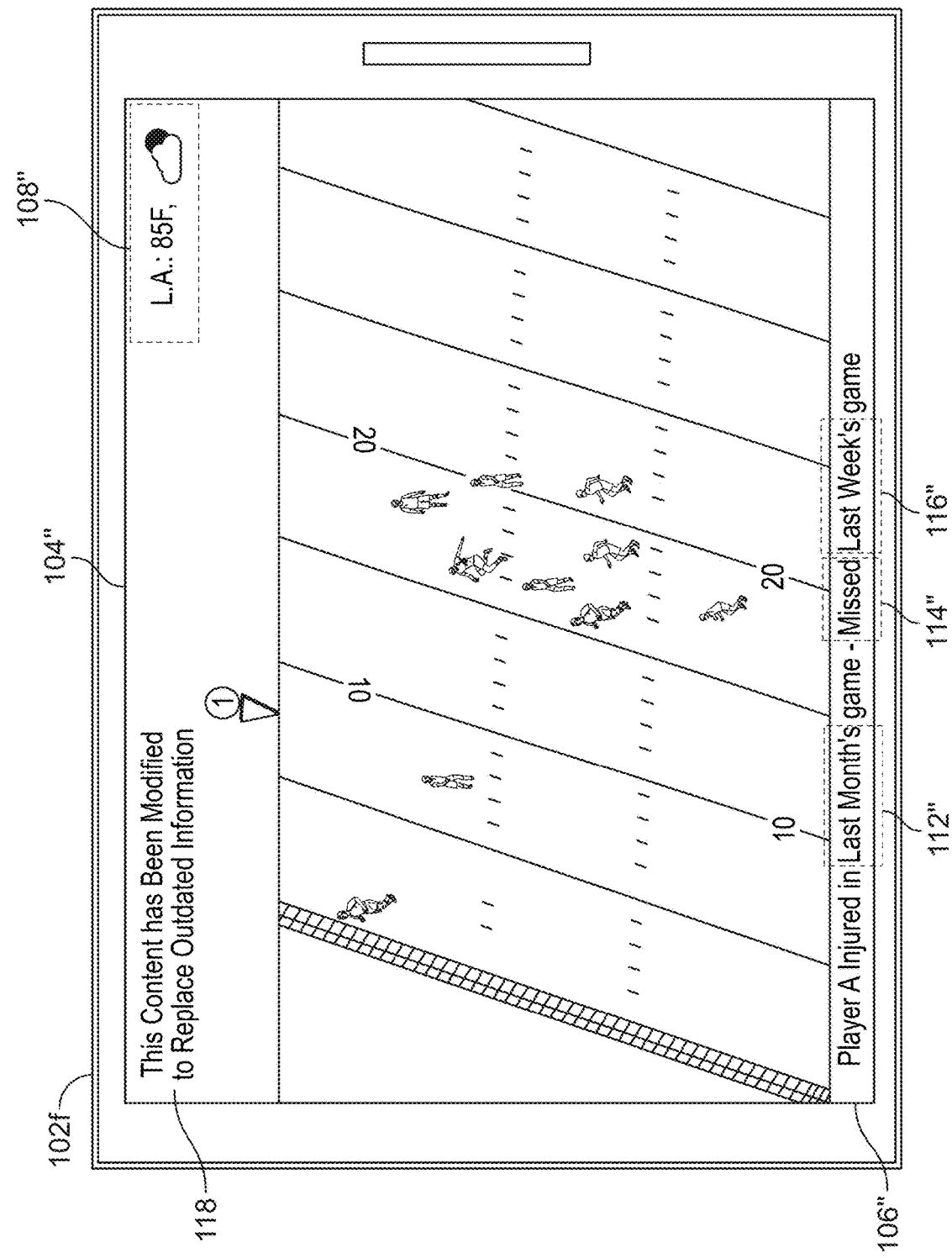
FIG. 4 depicts a display of an example of a further modified version in the scenario of FIG. 1.

FIG. 4 depicts an example of a display of modified content 104" on user equipment device 102*f* of user 100*f*. Because the content was forwarded by the user equipment device 102*c* at a time t3 that is later than time t2, the modified content 104" has undergone different modifications when compared with the modified content 104' shown in FIG. 3. In this example, more extensive changes have been made to the content 104. In the modified banner 106", the "LATEST" wording 110 in content 104 has been removed, the word "today's" 112 has been replaced with "last month's" 112". The term "will" miss, which includes the word "will" 114, and the term "next" 116 are replaced so that the statement indicates that the player "missed last week's game," as shown by updated wording 114", 116" in FIG. 4.

Figure 5:
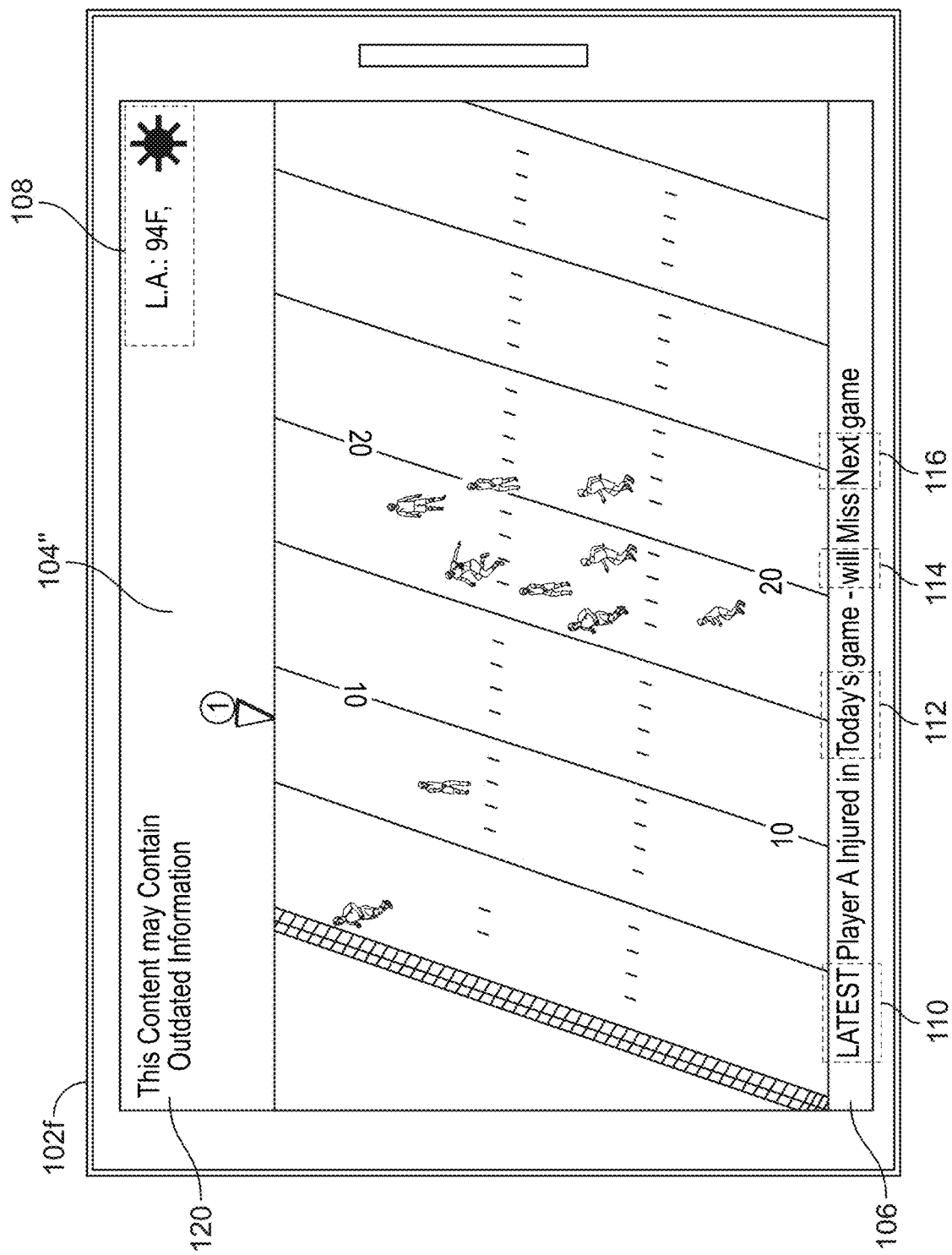
FIG. 5 depicts a display of another example of a further modified version of the content in the scenario of FIG. 1.

FIG. 5 depicts an alternative example of a display of modified content 104", in which the banner 106 is unchanged and still includes the wording 110, 112, 114 and 116 from the unmodified content 104. The weather forecast 108 is also unmodified. However, a notification 120 has been overlaid, or superimposed, on the clip, indicating that the displayed content may contain information that is outdated. Such a modification may be made in a scenario in which it is determined that a modification should not be made automatically, for example, if it is determined that the time-sensitive information is of a type that cannot be updated reliably, if updated information is not available, or if the available updated information is not associated with at least a predetermined level of confidence. Such determinations will be described in detail below.

Figure 6:
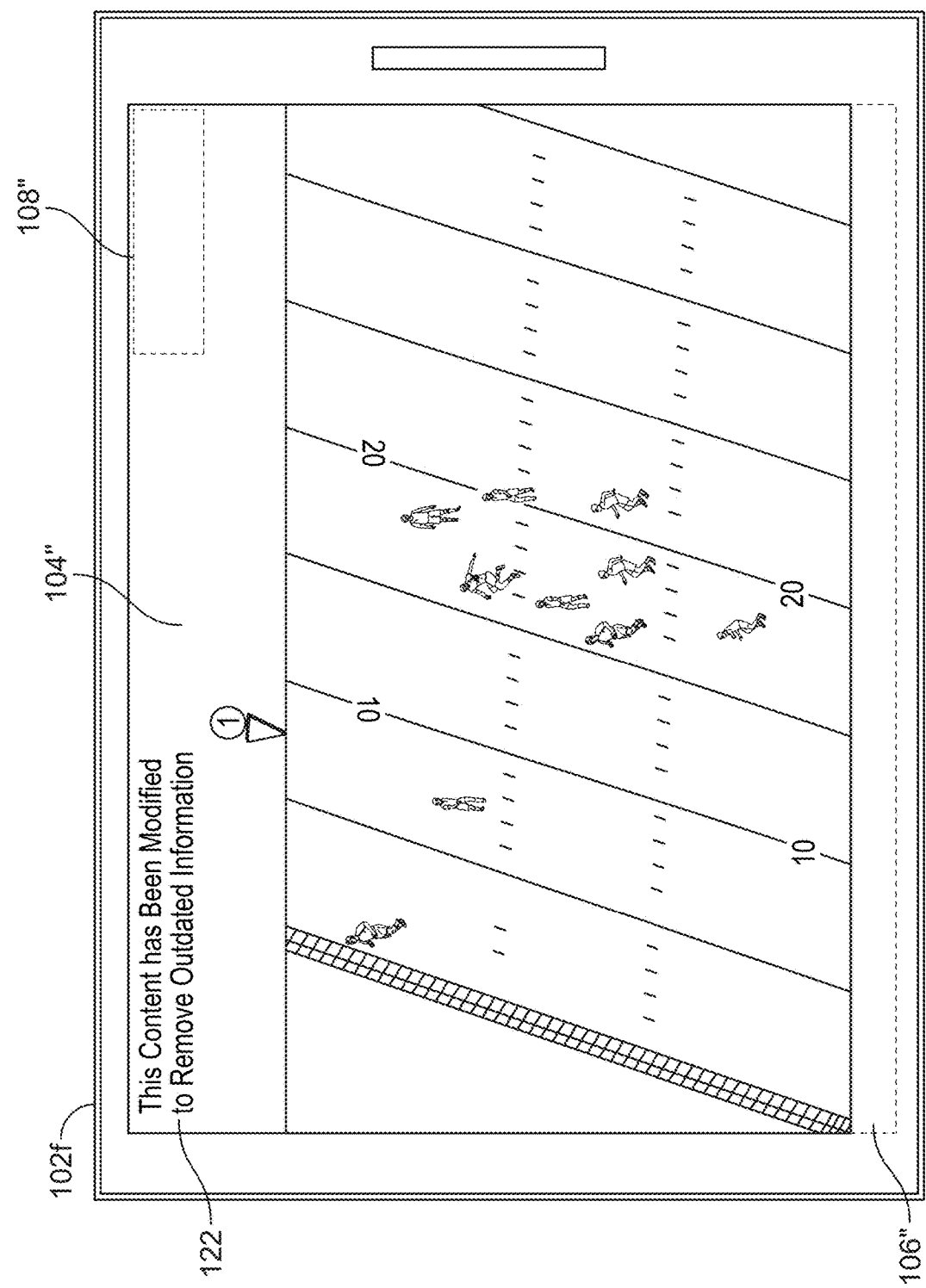
FIG. 6 depicts a display of yet another example of a further modified version of the content in the scenario of FIG. 1.

FIG. 6 depicts yet another example of a display of modified content 104", in which the banner 106 and weather forecast 108 have simply been removed. For example, the banner 106 and weather forecast 108 may be removed by overlaying, or superimposing, masks 106", 108" over the corresponding portions of the content, so that the banner 106 and weather forecast 108 are obscured, as shown in FIG. 6. In an alternative method, the modified content 104" may have been edited to remove or redact the text and symbols in those portions.

Optionally, a notification that the content has been modified may be provided, for example, as an overlaid, or superimposed, visual notification, such as text 122 or an icon, and/or an audio notification. In other examples, the notification may be omitted, so that the user 104*f* can consume the content without being aware of the modifications.

Figure 7:
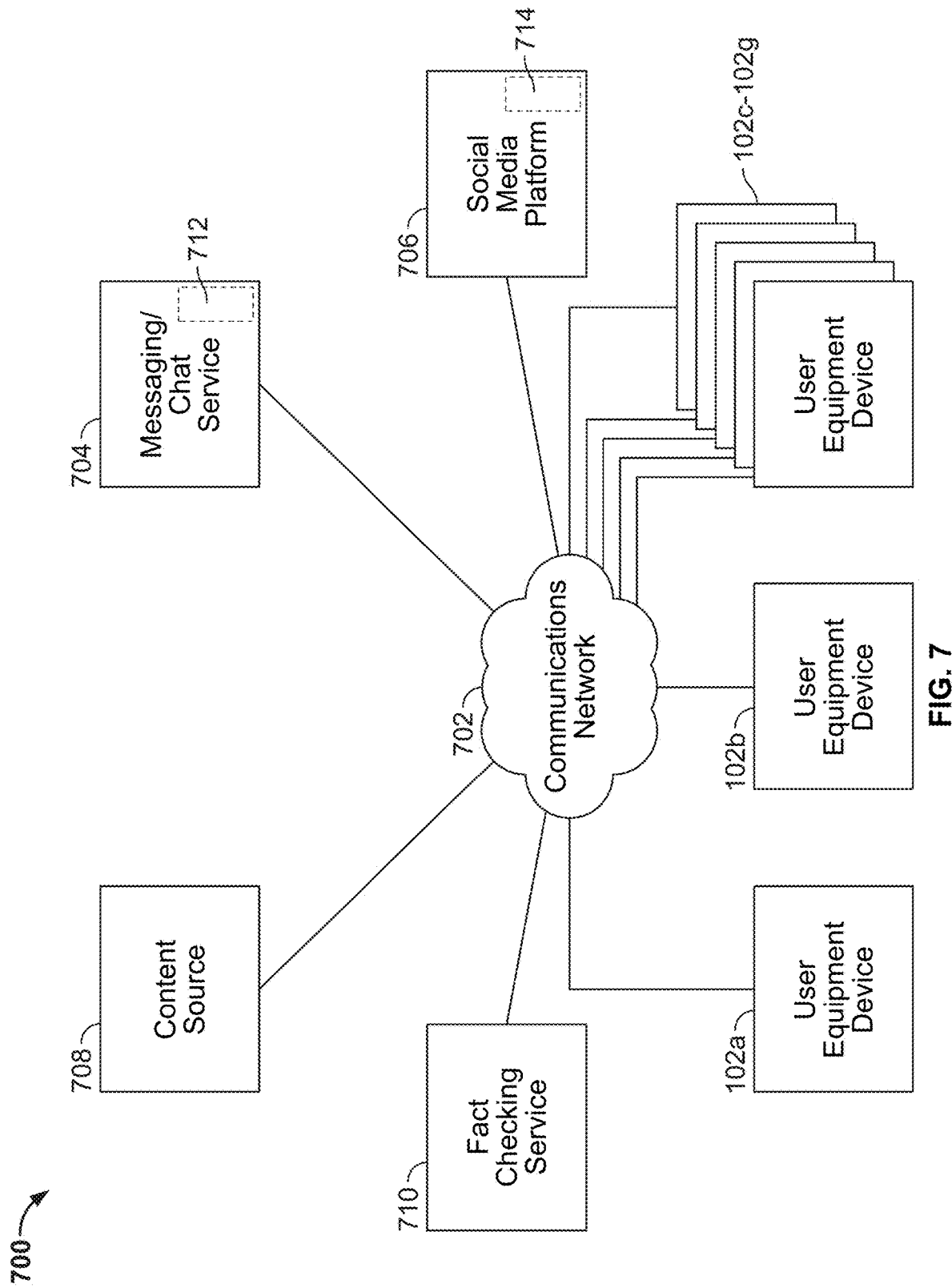
FIG. 7 depicts a block diagram of an example system that may be used to forward content according to an embodiment.

FIG. 7 is a block diagram of a system according to an embodiment in which content may be forwarded between the user equipment devices 102*a*-102*g* as shown in FIG. 1. The user equipment devices 102*a*-102*g* can communicate with each other via one or more communications networks 702, of which only one is depicted in FIG. 7. The user equipment devices 102*a*-102*g* may also communicate, via the one or more communications networks 702, with a remote server 704 providing a messaging service or chat service, a server 706 providing a social media platform 706, a content source 708, such as a media content source or other data source, or a fact checking service 710.

For example, the first user equipment device 102*a* may access content, for example by downloading the content 104 from a webserver, via the one or more communications networks 702, or accessing content received in a message, chat, or e-mail. The user 100*a* of the user equipment device 102*a* may then instruct the user equipment device 102*a* to forward the content 104 to users 100*b*, 100*c*, for example, by including it in a message sent via a messaging or chat service server 704 or directly between user equipment devices 102*a*-102*c*, or a post on a social media platform via server 706. The users 100*b*, 100*c* may then instruct their respective user equipment devices 102*b*, 102*c* to forward the content, for example, by forwarding the message via the messaging/chat service, or sharing the social media post via the social media platform.

The one or more communications networks 702 may be one or more networks including the Internet, a mobile phone network, mobile voice or data network, e.g., a 4G or LTE network, cable network, public switched telephone network, or other types of communications network or combinations of communications networks.

FIG. 7 shows communication paths to and from the communications network 702 that may, separately or together, include one or more communication paths, such as a satellite path; a fiber-optic path; a cable path; a path that supports Internet communications, e.g., IPTV, free-space connections, e.g., for broadcast or other wireless signals; or any other suitable wired or wireless communication path or combination of such paths. Communications with the user equipment devices 102*a*-102*g* may be provided by one or more of these communication paths, but are shown as single paths in FIG. 7 to avoid overcomplicating the drawing.

Although not shown in FIG. 7, the user equipment devices 102*a*-102*g* may be arranged to allow direct communication with each other via communication paths, such as those described above, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC.

Where provided, the content source 708 and/or fact checking service 710 may provide information to one or more of the user equipment devices 102*a*-102*g*, messaging/chat service 704, and social media platform 706 using a client-server approach. For example, a user equipment device 102*b* may pull data from a server that provides the fact checking service 710, or such a server may push data to the user equipment device 102*b*. In some embodiments, an application client residing on the user equipment device 102*b*, a server providing the messaging/chat service 704, or a server associated with the social media platform 706 may initiate a session with the content source 708 or fact checking service 710 to obtain data when needed, e.g., when it is determined that content being forwarded by a user 100*b* includes time-sensitive information that might be outdated.

Figure 8:
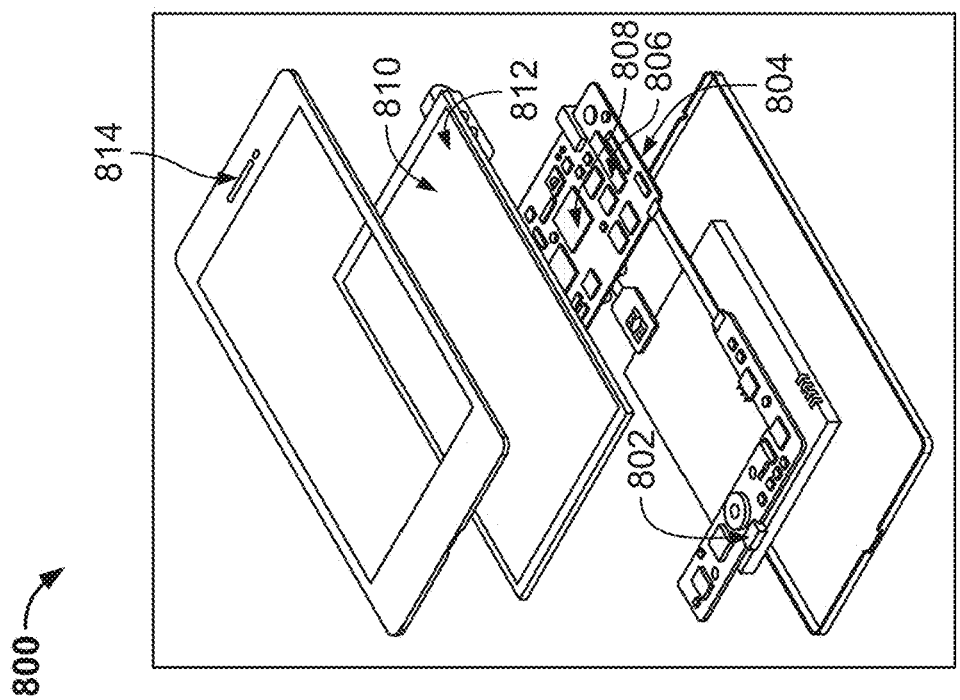
FIG. 8. depicts an apparatus that may be used to forward content according to an embodiment.

FIG. 8 depicts an illustrative example of a user equipment device 800 for forwarding and/or receiving content 104 that may be used as the user equipment device 102*b* and/or any of the other user equipment devices 102*a*, 102*c*-102*g*. In this particular example, user equipment device 800 is a smartphone. Alternatively, user equipment device 800 may be a tablet, another wireless communications device, a laptop computer, a personal computer, user television equipment, gaming machine, or other suitable device for accessing content. The user equipment device 800 is configured to receive content and data via input/output I/O) path 802. I/O path 802 may provide content (e.g., one or more of broadcast programming, on-demand programming, Internet content, content available over a local area network (LAN) or wide area network (WAN), and/or other content) and data to control circuitry 804, which includes processing circuitry 806 and storage 808. Control circuitry 804 may be used to send and receive commands, requests, and other suitable data using I/O path 802. I/O path 802 may connect control circuitry 804, and, specifically, processing circuitry 806, to one or more communications networks, such as communications network 702 shown in FIG. 7. I/O functions may be provided via one or more of these communication paths, but are shown as a single path in FIG. 8 to avoid overcomplicating the drawing. The user equipment device 102*b* also includes a user input interface 810 for receiving instructions from the user 100*b*, a display 812, and a speaker 814. In this particular example, the display 812 is a touch-screen display that is part of the user input interface 810.

Figure 9:
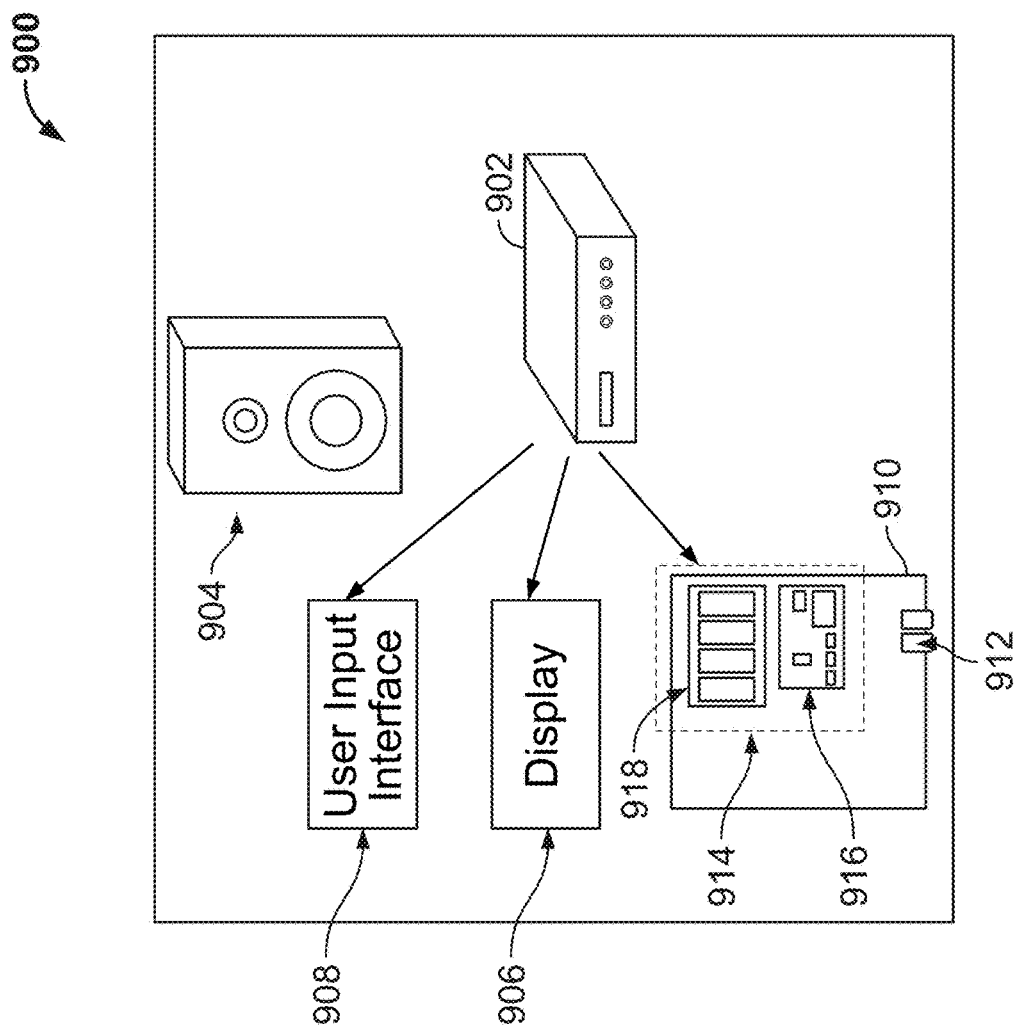
FIG. 9. depicts a media system including the apparatus of FIG. 8.

FIG. 9 depicts an example in which the user equipment device 100*b*, or any of the other user equipment devices 102*a*, 102*c*-102*g*, is part of a media system 900, such as a user television equipment system, an in-vehicle entertainment system, or other type of media system.

In this example, the user equipment device 100*b* is a set-top box 902 in a user television equipment system 900. The set top box 902 may be communicatively connected to one or more speakers 904 and a display 906. In this example, the display 906 is a television display or a computer display. The set top box 902 is communicatively coupled to user interface input 908. In some embodiments, user interface input 908 is a remote control device. Set top box 902 may include circuit board 910. The circuit board 910 may include processing circuitry, control circuitry, and storage (e.g., RAM, ROM, Hard Disk, Removable Disk, etc.), and an input/output path. The set top box 902 is configured to receive content and data via an I/O path 912, and comprises control circuitry 914, which includes processing circuitry 916 and storage 918.

The control circuitry 804, 914 of the user equipment device 800 or 900 may include any suitable processing circuitry 806, 916. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The control circuitry 804, 914 executes instructions for an application stored in storage 808, 918. Specifically, control circuitry 804, 914 may be instructed by applications to perform the functions discussed above and below. For example, applications may provide instructions to control circuitry 804, 914 to generate displays. In some implementations, any action performed by control circuitry 804, 914 may be based on instructions received from the applications.

The control circuitry 804, 914 includes communications circuitry suitable for communicating with an application server, networks or servers. In a client-server arrangement, the instructions for carrying out the above-mentioned functionality may be stored on an application server. The communications circuitry may include a cable modem, an integrated services digital network (ISDN) modem, a digital subscriber line (DSL) modem, a telephone modem, Ethernet card, or a wireless modem for communications with other equipment, or any other suitable communications circuitry via the one or more communications networks 702. In addition, communications circuitry may include circuitry that enables peer-to-peer communication between the user equipment devices 102*a*-102*g*.

As referred to herein, the phrase "storage" should be understood to mean any device for storing electronic data, computer software, or firmware, such as random-access memory, read-only memory, hard drives, optical drives, or any other suitable fixed or removable storage devices, and/or any combination of the same.

Control circuitry 804, 914 may include video generating circuitry and, optionally, tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of each one of user equipment device 800 or media system 900. The circuitry described herein, including for example, the tuning, video generating, encoding, decoding, encrypting, decrypting, scaler, and analog/digital circuitry, may be implemented using software running on one or more general purpose or specialized processors.

A user may send instructions to control circuitry 804, 914 using the user input interface 810, 908. User input interface 810, 908 may be any suitable user interface, such as a remote control, mouse, trackball, keypad, keyboard, touch-screen, touchpad, stylus input, joystick, voice recognition interface, or other user input interfaces. The display 812, 906 may be provided as a stand-alone device or integrated with other elements of the user equipment device 800 or media system 900. For example, as discussed above in relation to FIG. 8, the display 812, 906 may be a touch-screen or touch-sensitive display. In such circumstances, the user input interface 810, 908 may be integrated with or combined with the display 812, 906. Display 812, 906 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, the display 812, 906 may be HDTV-capable. In some embodiments, display 812, 906 may be a 3D display, and the interactive application and any suitable content may be displayed in 3D. A video card or graphics card may generate the output to the display 812, 906. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 804, 914. The video card may be integrated with the control circuitry 804, 914. The speakers 814, 904 may be provided as integrated with other elements of the user equipment device 800 or media system 900 or may be stand-alone units. The audio component of videos and other content displayed on display 812, 906 may be output through the speakers 814, 904. In some embodiments, the audio may be distributed to a receiver, not shown, which processes and outputs the audio via external speakers 904.

The applications may be stand-alone applications implemented on the user equipment devices 800, 902. For example, the application may be implemented as software or a set of executable instructions which may be stored in storage 808, 918 and executed by control circuitry 804, 914 of the user equipment device 800, 902.

In some embodiments, the applications may be client-server applications where only a client application resides on the user equipment device, and a server application resides on a remote server. For example, applications may be implemented partially as a client application on the control circuitry 804, 914 and partially on a remote server as a server application running on control circuitry 712, 714 of the remote server, such as a server 704 implementing a messaging/chat service 704 or a server 706 implementing a social media platform, shown in FIG. 7. When executed by the control circuitry 712, 714 of the remote server 704, 706, the application may instruct the control circuitry 712, 714 of the remote server 704, 706 to generate application displays and transmit the generated displays to the user equipment device 800, 902. The server application may instruct the control circuitry 712, 714 of the remote server 704, 706 to transmit data for storage on the user equipment 800, 902. The client application may instruct the control circuitry 804, 914 of the user equipment 800, 902 to generate the application displays.

Figure 10:
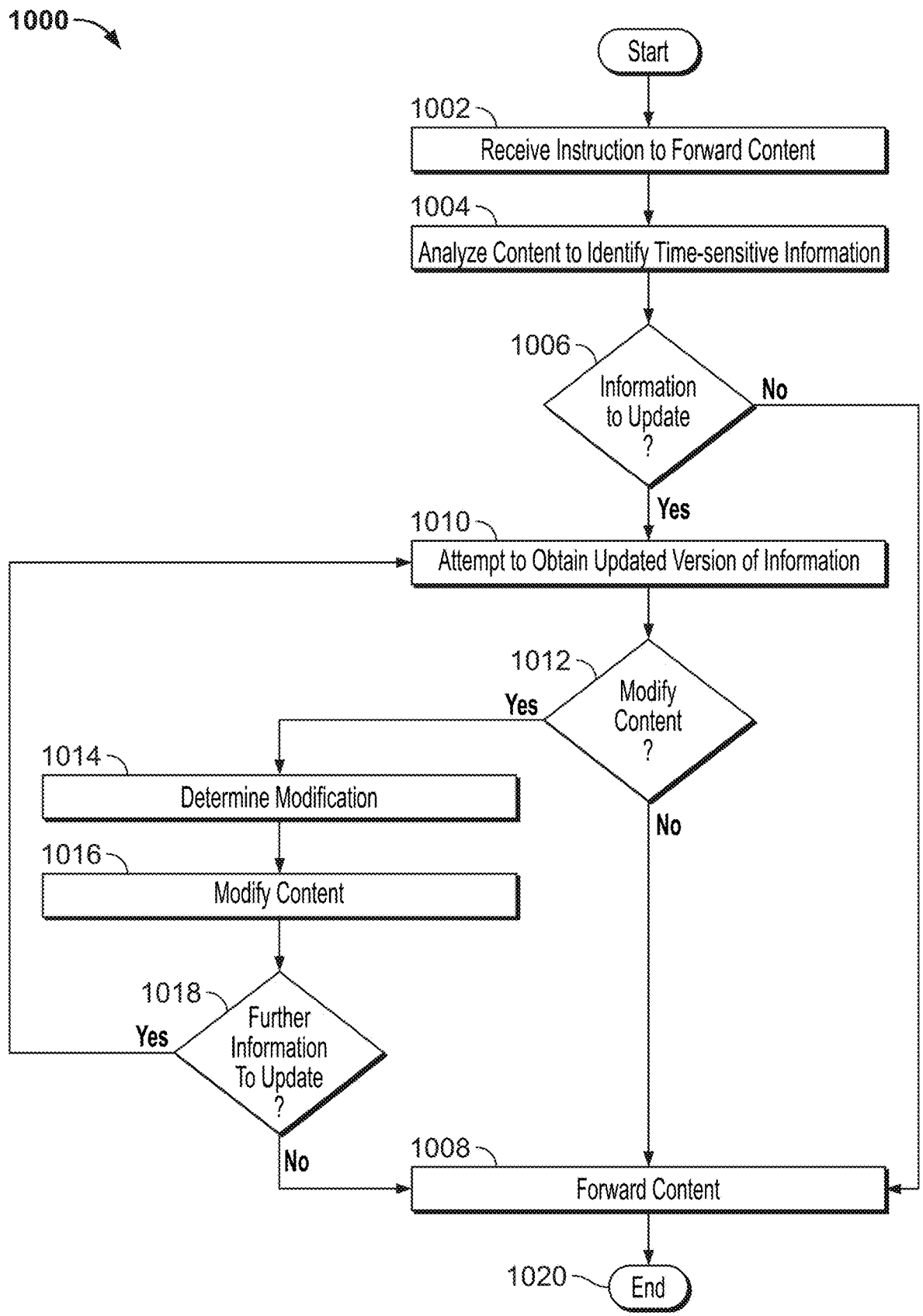
FIG. 10 is a flowchart of an example process for forwarding content according to an embodiment.

FIG. 10 is a flowchart of a process that may be performed by the user equipment device 102b. In this particular example, the user equipment device 102b is a smartphone 800. However, it is understood that the process may, instead, be performed by any of the other user equipment devices 102a-102g, and by other types of user equipment device, such as the set-top box 902 in the media system 900 of FIG. 9. Alternatively, in a client-server arrangement, the process of FIG. 10 may be performed by the user equipment device 102b, 800 in conjunction with a remote server, such as server 704, 706. In yet another example, the process may be performed in its entirety by the control circuitry 712, 714 of such a remote server 704, 706, in response to an instruction to forward content received from a user equipment device 102b, 800.

Beginning at step 1000, an instruction to forward content is received (step 1002). For example, the user 100b may request forwarding of the content 104 via the user input interface 810 by selecting an option to forward the content 104 and indicating one or more users 100d, 100e or user equipment devices 102d, 102e, to whom the content will be forwarded, e.g., by selecting users from a list of contacts presented on the display 812.

The control circuitry 804 then analyzes the received content 104 to identify any time-sensitive information (step 1004), for example, by parsing the content 104 to identify time-sensitive information that is presented in a portion of the content 104. In the example shown in FIG. 3, the content 104 is a video clip including the video images of the game, text in banner 106 and text and symbols in the weather forecast 108. In addition, the content 104 may include audio data, such as a commentary. The parsing may be performed for one or both of the video and audio data, to identify time-sensitive information in visible rendered text, such as the text in the banner 106; audio, such as an audio commentary included in the content 104; or video/images of a media asset, such as the weather forecast 108.

The parsing may identify words and phrases that relate to time in the video data, such as the words "LATEST" 110, "today's" 112, "will" 114, and "next" 116 in the banner 106, which indicate that the banner contains time-sensitive information. The audio data may be parsed to identify similar keywords in the audio commentary. The parsing may additionally, or alternatively, identify types of information that are relevant to a particular point in time, such as the weather forecast 108 based on identifying a temperature and/or the image of a weather related symbol provided in the weather forecast 108.

At step 1006, the control circuitry 804 determines whether the content includes information to be updated. For example, if no time-sensitive information is identified at step 1004, the control circuitry 804 may determine that the content 104 does not include any information that might require updating and may then proceed to forward the content 104 without modifying it (step 1008). Optionally, the content 104 may include an indication that it should not be modified. For example, a user 100a who created or previously forwarded the content may have selected an option to prohibit modification when the content 104 is forwarded by other users, causing a flag or other indication of the prohibition to be included in the content 104 or in associated metadata.

Step 1006 may include determining a period of time between the time t1 at which the content 104 was forwarded to the user equipment device 102b, 800 and the time t2 at which the user 100b instructs the user equipment device 800 to forward the content to other users 100c, 100d. If that period of time is less than a predetermined period of time, then the control circuitry 804 may determine that no update is needed because any time-sensitive information is unlikely to be outdated and may proceed directly to forwarding the content 104 without modification (step 1008). Where metadata associated with the content 104 indicates a date and/or time when the content 104 was created or originally made available, then such a determination may be made on the period of time that elapsed between the date and/or time indicated in the metadata and time t2. In yet another example, such a determination may be made based on a time elapsed between a time at which the user equipment 102b, 800 received the content 104 forwarded by the first user equipment device 102 and time t2.

In response to determining that the content includes information to be updated (step 1006), the control circuitry 804 attempts to obtain an updated version of the time-sensitive information (step 1010). For example, the control circuitry 804 may obtain an updated version 108' of the weather forecast 108 from a content source 708 such as a meteorological service or weather forecast website. Similarly, an updated sports score, share price, or other statistic may be obtained from a suitable content source 708.

Alternatively, or additionally, the control circuitry 804 may send a query to a fact-checking service server 710, to obtain an updated version of time-sensitive information. This option may be used for quantitative information, such as sports scores, share prices, and other statistics and/or qualitative information such as the statement including wording 110, 112, 114, 116 in the banner 106. With reference to the example depicted in FIG. 4, a fact checking service 710 may be queried to confirm that the "next game" has not yet occurred. In the example shown in FIG. 5, the fact checking service 710 may be queried to confirm that Player A actually missed the next game.

The control circuitry determines whether or not the content 104 should be modified automatically (step 1012). For example, the determination may be based on one or more of the source of the updated version; one or more characteristics of the time-sensitive information; one or more characteristics of the content 104; or the availability of an updated version of the time-sensitive information.

Step 1012 may include the control circuitry 804 determining a level of confidence associated with a source of the updated version of the time-sensitive information and determine whether to modify the content based on whether a predetermined confidence level is met. Information obtained from an official source, such as an official information service, professional fact-checking service, or official web site may be given a higher level of confidence than an updated version obtained from a fan website, crowdsourced information repositories, social media posts or a source known to have previously provided misleading information.

The determination may be based on a characteristic of the time-sensitive information, such as its type. Quantifying information may be updated with higher level of confidence than qualifying information. A numerical value, such as a share price, or a statement that a numerical value has increased or decreased can be automatically updated with a relatively high level of confidence in its accuracy. Qualifying information, however, may be more difficult to update. For example, a statement that a particular flight is the "best flight" between two specific destinations is potentially ambiguous, because the adjective "best" might be based on considerations that are not evident from the analysis of the content. For example, the adjective "best" might be based on one or more of an airfare, a flight duration, a transfer time, a customer satisfaction rating of one or more airlines, or amenities available during the flight. Consequently, it might not be possible to replace the flight details with a level of confidence in its accuracy as high as the confidence level associated with quantifying information.

In another embodiment, a characteristic of the content is determined, such as a genre identified in metadata in, or accompanying, the content 104. If the genre is typically time-sensitive, such as news or sports content, then it may be determined that the time-sensitive information should be updated. If the genre is typically not time-sensitive, such as a documentary, drama, or comedy, then it may be determined that the time-sensitive information should not be updated.

Although the example determinations discussed above are based on a single consideration, i.e., the source, a characteristic of the time-sensitive information, or a characteristic of the content, the determination made in step 1012 may be based on a combination of any two or more of these considerations.

In some embodiments, if no updated version of the information was found in step 1010, it may be determined at step 1012 that the content 104 should not be modified, and unmodified content 104 is then forwarded at step 1008. In other embodiments, it may be determined that, if no updated version of the information was found in step 1010, the content 104 should be modified, for example, by adding a notification 120 that the content may be outdated.

In response to determining that the content is to be modified (step 1012), the control circuitry 804 determines the modification to be made to the content (step 1014). The modification may include replacing at least a portion of the time-sensitive information with the updated information, adding the updated information to the displayed content, presenting one or more of an icon, text, audio indication or video indication to indicate that at least some of the content is, or may be, outdated, or removing at least a portion of the time-sensitive information. This determination may be based on one or more of the source of the updated version, one or more characteristics of the time-sensitive information, one or more characteristics of the content 104, or the availability of an updated version of the time-sensitive information.

The determination may be based on a level of confidence associated with the source in a similar manner to that discussed above in relation to step 1012. For example, where the source is associated with a high level of confidence, the content 104 may be modified to replace the time-sensitive information with the updated version, for example, as shown by the updated weather forecasts 108', 108" in FIGS. 3 and 4. If the source is associated with a low level of confidence, then the content 104 may be modified by adding a notification 120 overlaying the video clip to indicate that the content may contain outdated information, for example, as shown in FIG. 5, or by removing the time-sensitive information, for example, as shown in FIG. 6. The level of confidence associated with the source may be compared with a predetermined level of confidence to ascertain whether it is a high level or a low level. Where the determination in step 1012 was also based on the level of confidence associated with the source, the predetermined level of confidence used to determine the modification in step 1014 may be different from the predetermined level of confidence used to determine whether to modify the content in step 1012.

The determination may be based on a characteristic of the time-sensitive information, such as its type. As discussed above in relation to step 1012, quantifying information may be updated with higher level of confidence than qualifying information. If the time-sensitive information is quantifying information, the content may be modified by replacing the time-sensitive information with the updated version. If the time-sensitive information is qualifying information, then the content 104 may be modified by adding a notification 120 that the content may contain outdated information, or by removing the time-sensitive information. Hence, a banner or ticker showing a sports score, current weather conditions, share prices, or a numerical value may be replaced with updated information, while a banner or ticker showing a quote, opinion, or prediction may be displayed with a notification that the content may be outdated 120, or a notification conveying the updated information. Alternatively, such a banner or ticker may removed by, or example, being masked or redacted.

The determination may be based on a characteristic of the content, such as a genre or date identified in metadata in, or accompanying, the content 104. If the genre is typically time-sensitive in nature, such as news, and a date associated with the content is recent, then the content may be updated by replacing the time-sensitive information. If the genre is not typically sensitive, then it may be determined that the time-sensitive information may simply be removed. In another embodiment, if the genre is not typically time-sensitive and/or a date associated with the content indicates that it is a historical clip, then the content may be modified by adding a notification 120 that the content may include outdated information.

Although the example determinations discussed above in relation to step 1014 are each based on a single consideration, i.e., the source, a characteristic of the time-sensitive information, or a characteristic of the content, the determination made in step 1014 may be based on a combination of any two or more of these considerations.

The determination in step 1014 may include determining whether or not to include a notification that the content 104 has been modified, such as the notifications 118, 122 shown in FIGS. 4 and 6. Such a notification 118, 120 may be overlaid, or superimposed, on the content based on an option selected by the user 100b of the user equipment device 102b, or may be included automatically whenever content 104 is modified by the user equipment device 102b.

The content 104 is then modified by making the modification determined in step 1014 (step 1016). In addition, a flag or other indication may be added to the content or its associated metadata to indicate that the content has been modified.

If it is determined that additional time-sensitive information was identified in step 1006 (step 1018), then the process returns to step 1010, attempts to obtain an updated version of the additional time-sensitive information, and repeats the steps of determining whether to modify the content (step 1012), if so, then determining the modification (step 1014), and applying the determined modification (step 1016), until all the identified time-sensitive information has been processed (step 1018). For example, after steps 1010-1016 have been performed for the weather forecast 108 in content 104, steps 1010-1016 may then be repeated for the information in the banner 106 of content 104.

When it is determined that no further time-sensitive information is to be processed (step 1018), the modified content 104' is forwarded to the user equipment devices 100d, 100e of the other users 100d, 100e (step 1008), completing the process (step 1020).

In the example scenario shown in FIG. 1, the process of FIG. 10 may also be performed when the user 100c instructs its user equipment 102c to forward the content 104 to users 100f, 100g at time t3. Because time t3 is later than time t2, the modified content 104" forwarded to users 100f, 100g may differ from the modified content 104' forwarded to users 100d, 100e. Because the time elapsed between t1 and t3 is longer than the time elapsed between t1 and t2, the updated version of the time-sensitive information may reflect further changes that occurred between times t2 and t3, the availability of an updated version may have changed, and certain determinations regarding whether to modify the content and/or the modification to be made may have different outcomes. In this way, the time relevancy of the content 104 may be maintained or, at least, indicated, to the users 100f, 100g.

If one of the users 100d, 100e decides to forward the content to another user, not shown, then the process of FIG. 10 may be repeated to determine whether to modify the modified content 104' to take account of the time elapsed between time t2 and a time t4 at which the user 100d instructs the user equipment device 102d to forward the content to another user. In this way, the static content 104 previously forwarded by user 100a can be progressively modified over time to maintain its time relevancy and/or alert recipients to potentially outdated information.

Figure 11:
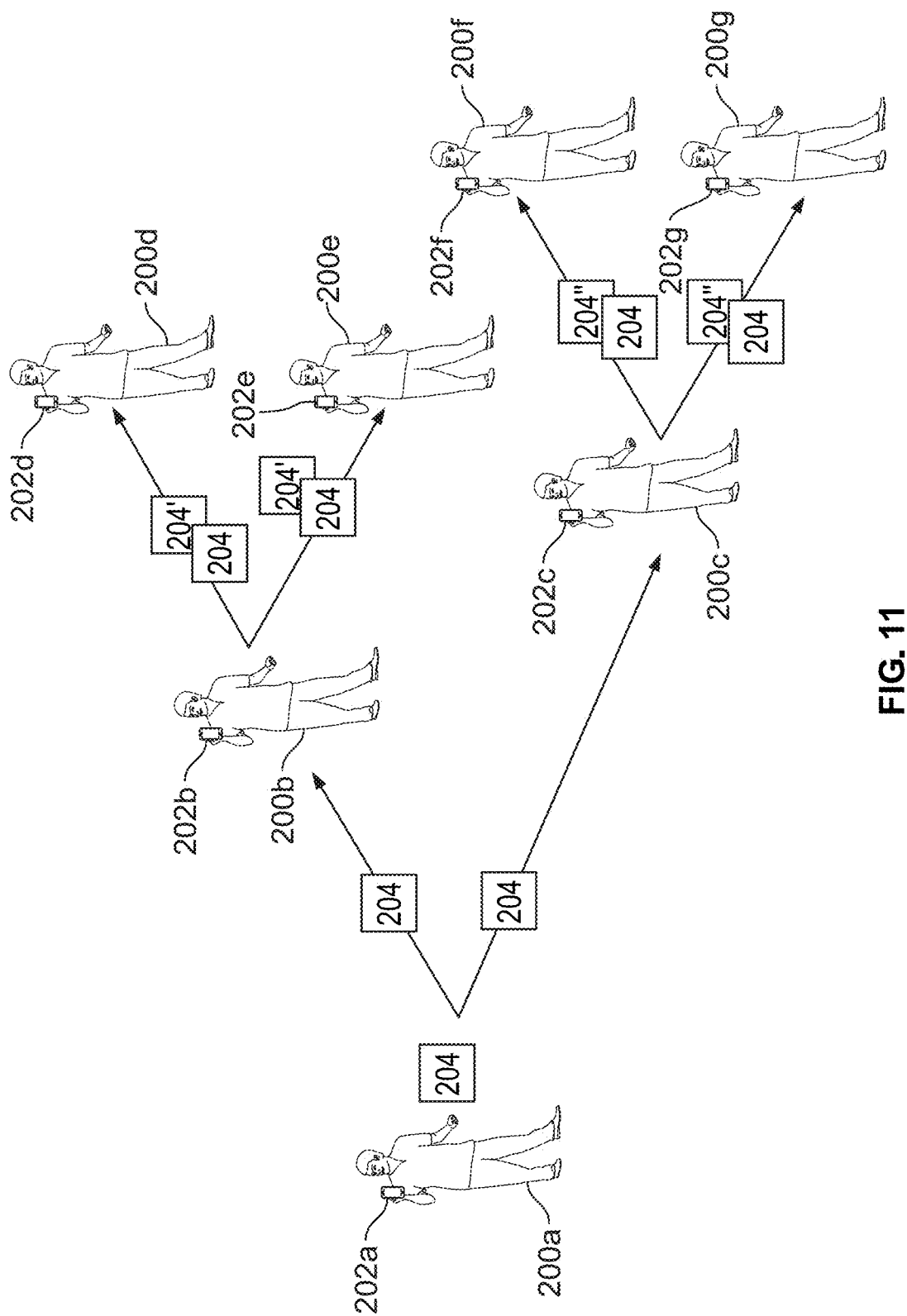
FIG. 11 depicts an example scenario in which content is forwarded by one user to another, according to another embodiment.

FIG. 11 depicts a scenario in which content is forwarded according to another embodiment. In this example, content 204 forwarded by a first user 200a at time t1 is received by user equipment devices 202b, 202c. Users 200b, 200c instruct their respective user equipment devices 202b, 202c to forward the content 204 at times t2 and t3 respectively. When the modified content 204' is forwarded from user equipment device 202b to user equipment devices 202d, 202e, both the original content 204 and modified content 204' are forwarded for consumption by users 200d, 200e. In this example, when the modified content 204" is forwarded from user equipment device 202c to user equipment devices 202f, 202g, both the original content 204 and modified content 204" are forwarded for consumption by users 200f, 200g, in a similar manner.

Figure 12:
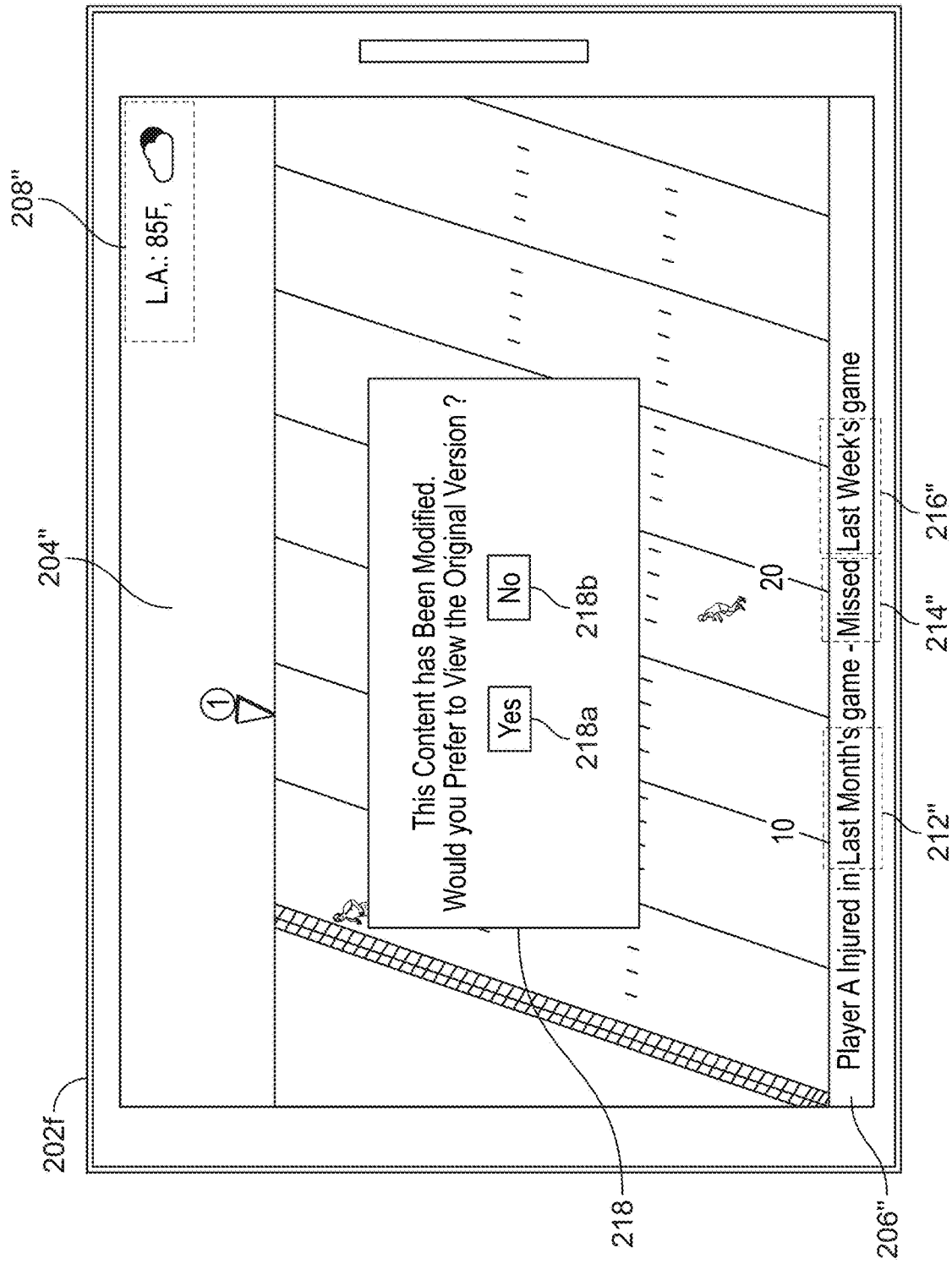
FIG. 12 depicts a display of a modified version of the content in the scenario of FIG. 11.

The user equipment devices 202d-202g may then allow the respective users 200d-200g to select the original content 204 or the modified content 204" for consumption. For example, as shown in FIG. 12, when a user 200f accesses the content, their user equipment may display with a prompt 218 with user selectable options 218a, 218b to view the original content 204 or the modified content 204", which includes modified portions 206", 208", 212", 214", 216", similar to the corresponding portions 106", 108", 112", 114", 116" shown in FIG. 4. In a voice controlled system, the prompt may be an audio message allowing the user an opportunity to provide input indicating whether they wish to consume the original content 204 or modified content 204". In response to the user selection or indication, the selected content 204 or 204" is presented to the user 100f.

Figure 13:
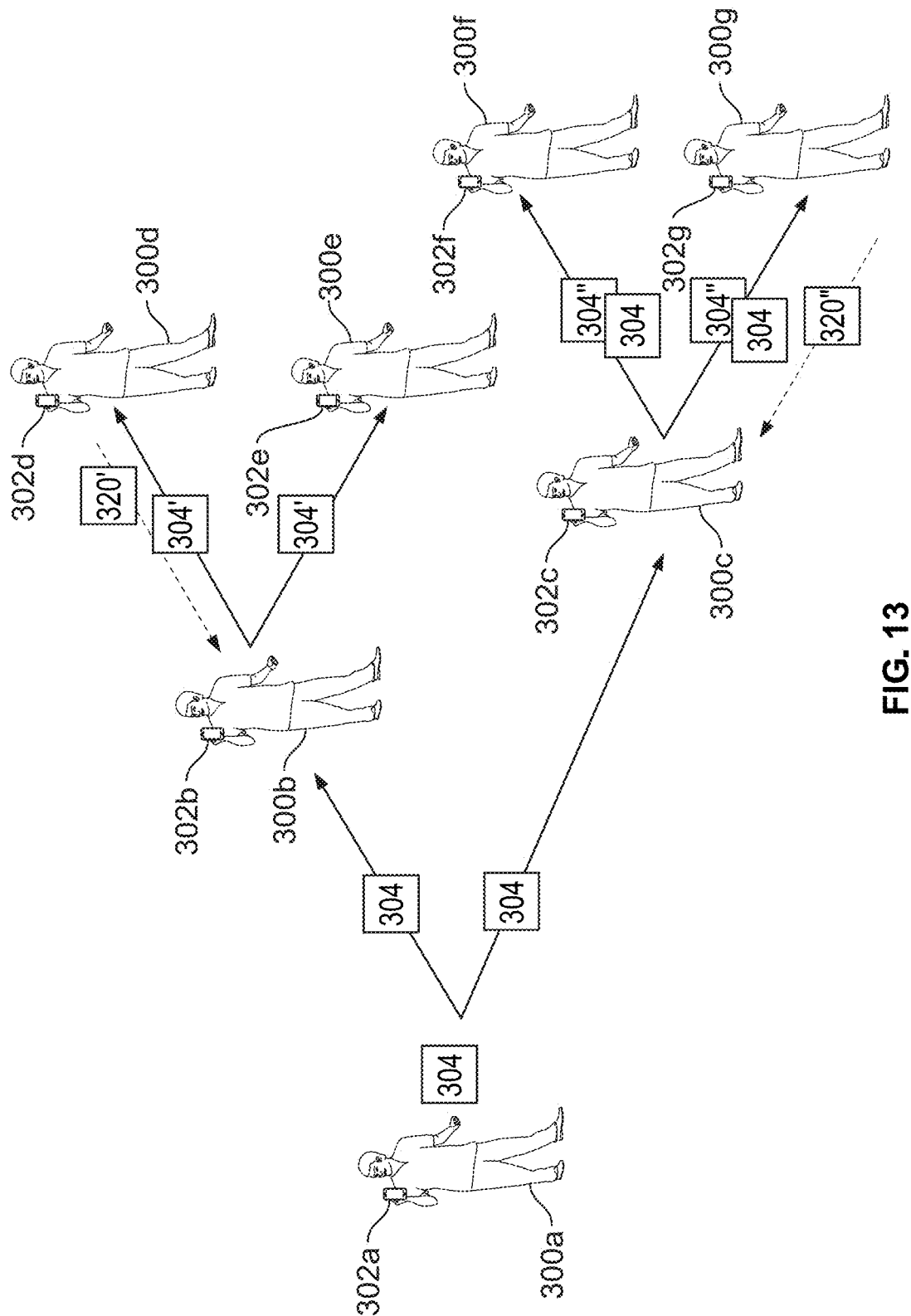
FIG. 13 depicts an example scenario in which content is forwarded by one user to another, according to yet another embodiment.

FIG. 13 depicts a scenario in which content is forwarded according to yet another embodiment. In this example, content 304 forwarded by a first user 300a at time t1 is received by user equipment devices 302b, 302c. Users 300b, 300c instruct their respective user equipment devices 302b, 302c to forward the content 204 at times t2 and t3 respectively. In this particular example, user equipment device 302b forwards the modified content 304' to user equipment devices 302d, 302e, without the original content 304, and both the original content 204 and the modified content 304" are forwarded from user equipment device 302c to user equipment devices 302f, 302g.

Figure 14:
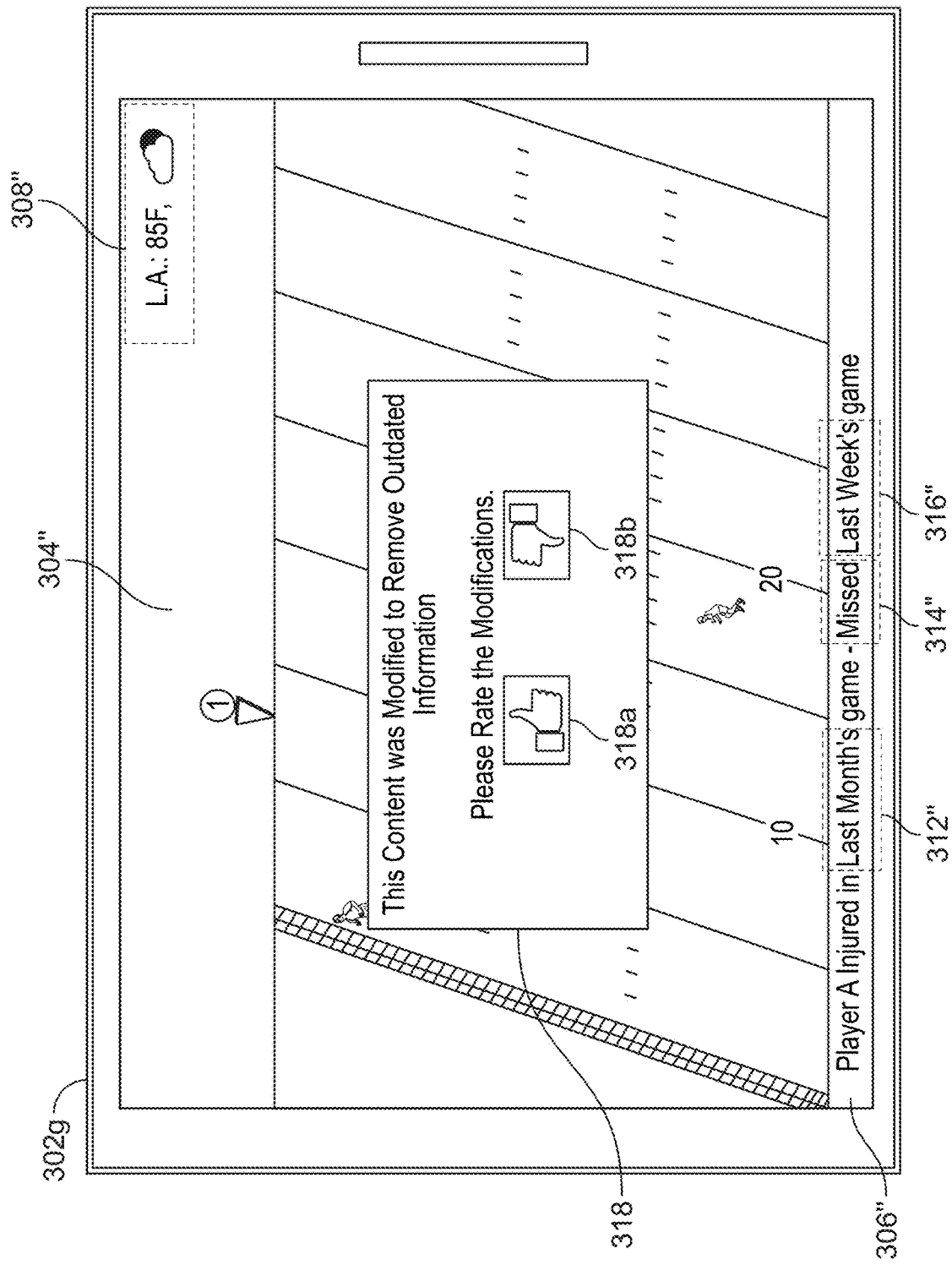
FIG. 14 depicts a display of a modified version of the content in the scenario of FIG. 13.

The user equipment devices 302d-302g may then allow the respective users 300d-300g to provide feedback 320', 320" on the modified content 304' or 304". For example, as shown in FIG. 14, a prompt 318 may be displayed allowing the user 302g to select an option 318a, 318b to provide their feedback 320" regarding the modifications. In a voice controlled system, the prompt may be an audio message allowing the user 302g an opportunity to provide audio feedback. While the example depicted asks the user 302g to select either a positive feedback option 318a or negative feedback option 318b, other forms of feedback may be solicited. For example, the user 302g may be asked to provide a numerical rating, or text, indicating their feedback. Feedback 320', 320" may be requested from a user 302g to whom both the original content 304 and modified content 304" were sent, and/or from a user 302d that received only modified content 304'.

The feedback 320', 320" is returned to the user equipment device 302b, 302c from which the forwarding of the modified content 304', 304" was instigated. The user equipment device 302b, 302c may then use the feedback 320', 320" to inform future modifications of static content. In embodiments in which content is modified by a messaging/chat service server 704, social media platform server 706, or other remote server, then the feedback may be used by that server to inform such future modifications.

Figure 15:
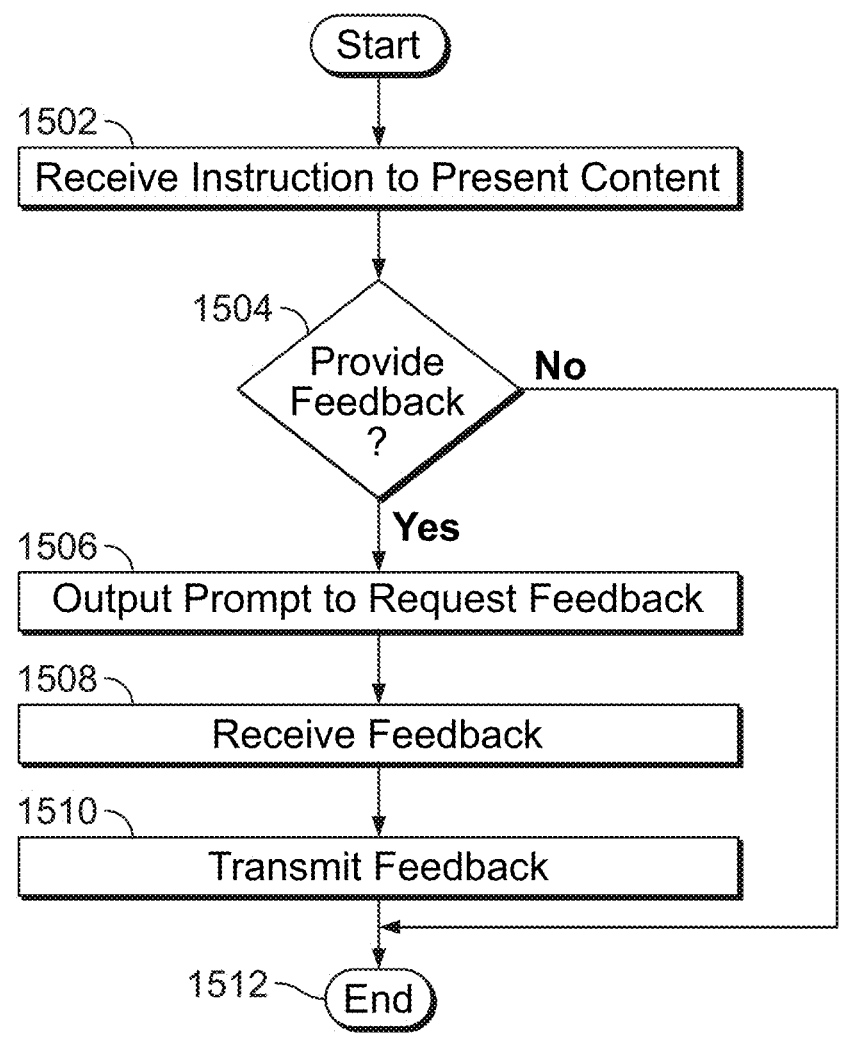
FIG. 15 is a flowchart of an example process for receiving content in the example of FIG. 13.

FIG. 15 depicts an example process that may be performed by a user equipment device 302g to provide feedback. In this particular example, user equipment device 302g is a smartphone 800 and has received modified content 304" from user equipment device 302c.

Beginning at step 1500, the control circuitry 804 of the user equipment device 302g receives an instruction to present the forwarded content 304".

Next, the control circuitry 804 determines whether feedback should be provided (step 1504). For example, the modified content 304" and/or associated metadata may include an indication that feedback is requested. Alternatively, a determination to provide feedback may be made in response to instructions from the user 302g to view both the original content 304 and the modified content 304", if both versions were forwarded to the user equipment device 302g, 800. In yet another example, the provision of feedback may be a default setting, or an option to provide feedback may be output automatically when a user 302g has finished consuming the modified content 304".

If it is determined that feedback should be provided, then a visual or audio prompt is output to request the user's feedback (step 1506), such as the prompt 318 shown in FIG. 14.

The user's feedback is received (step 1508), for example, by the user selecting an option 318a, 318b displayed on screen, or providing a rating or comment via alphanumeric or audio input.

The feedback 320" is then transmitted (step 1510). In the example shown in FIG. 14, the feedback 320" is returned to the user equipment device 302c from which the forwarding of the modified content 304" was instigated, completing the process (step 1512). In examples where the content was modified by a messaging/chat service server 704, social media platform server 706, or other remote server, then the feedback may be transmitted to that server. In such examples, the destination for such feedback may be indicated in the metadata associated with the content, for example, in conjunction with an indication that feedback is requested and/or an indication that the content has been modified.

Figure 16:
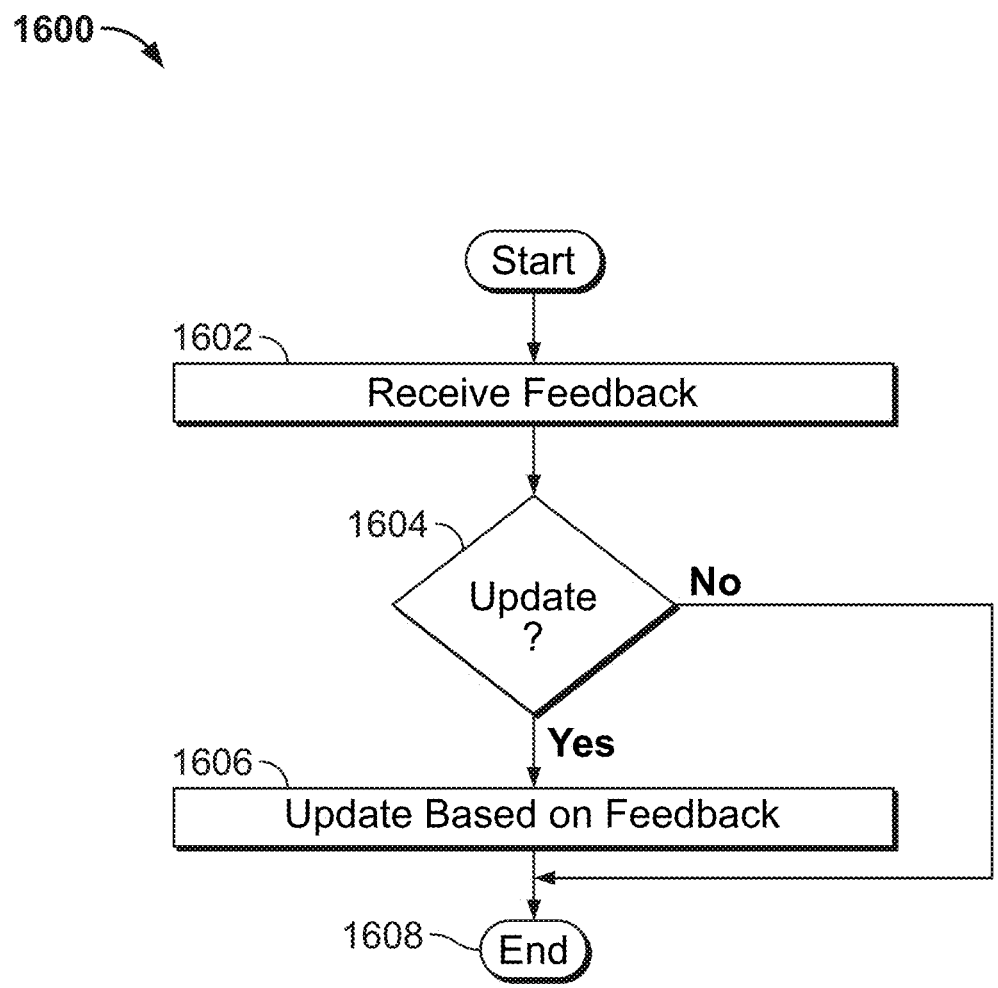
FIG. 16 is a flowchart of an example process for receiving feedback in the example of FIG. 13.

FIG. 16 is a flowchart of a process for receiving feedback that is performed by the user equipment 302c in the example shown in FIG. 13. However, in embodiments where the modifications were made by a remote server, the process of FIG. 16 may, instead, be performed by that server.

Starting at step 1600, the feedback 320" is received from the user equipment device 302g (step 1602). The reception of the feedback may include parsing the feedback to determine whether it is positive feedback or negative feedback. For example, where the feedback is in the form of a text or audio comment, the feedback 320" may be analyzed to identify words indicating a positive or negative rating.

A determination as to whether an update to the modification process should be made based on the feedback 320" is then made (step 1604). For example, if it is determined that the feedback is positive feedback, then an update may be unnecessary. If the feedback is negative, then it may be determined that an update is necessary. If the feedback is in the form of a rating, then the rating may be compared with one or more predetermined ratings to determine whether an update should be made and, optionally, a magnitude of a change to be made in such an update.

If it is determined that an update should be made (step 1604), then an update is performed based on the feedback (1606). The update may change a model, parameters of a model or predetermined levels of confidence used in determining whether to modify content (step 1012 of FIG. 10) and/or determining a modification to be made to content (step 1014 of FIG. 10). For example, if a user 302g provides feedback 320" indicating a negative view of a particular modification that replaced time-sensitive information, then a predetermined level of confidence used to determine whether to replace time-sensitive information in step 1014 of FIG. 10 may be increased, so that similar modifications made in the future are more likely to take the form of displaying a notification 120 that the content may contain outdated information, instead of replacement of the time-sensitive information. In another example, if the user 302g provides feedback 320" indicating a negative view of the modified content 304" in general, then a predetermined level of confidence used to determine whether or not to modify the content in step 1012 of FIG. 10 may be increased, increasing the likelihood that similar content in the future will be forwarded without modification.

After making one or more updates (step 1606) or, alternatively, if it is determined that no updates are needed (step 1604), the process ends (step 1608).

Although the examples described above and, in particular, the process of FIG. 10, relate to modifying content that is being forwarded by a user 100b, 100c, 200b, 200c, 300b, 300c, in other embodiments, similar modifications may be made by a user equipment device 102d-g, 202d-g, 302d-g that receives, or outputs, content 104, 204, 304, in addition to, or instead of, modifications being made by a forwarding user equipment device 102b, 102c, 202b, 202c, 302b, 302c.

Figure 17:
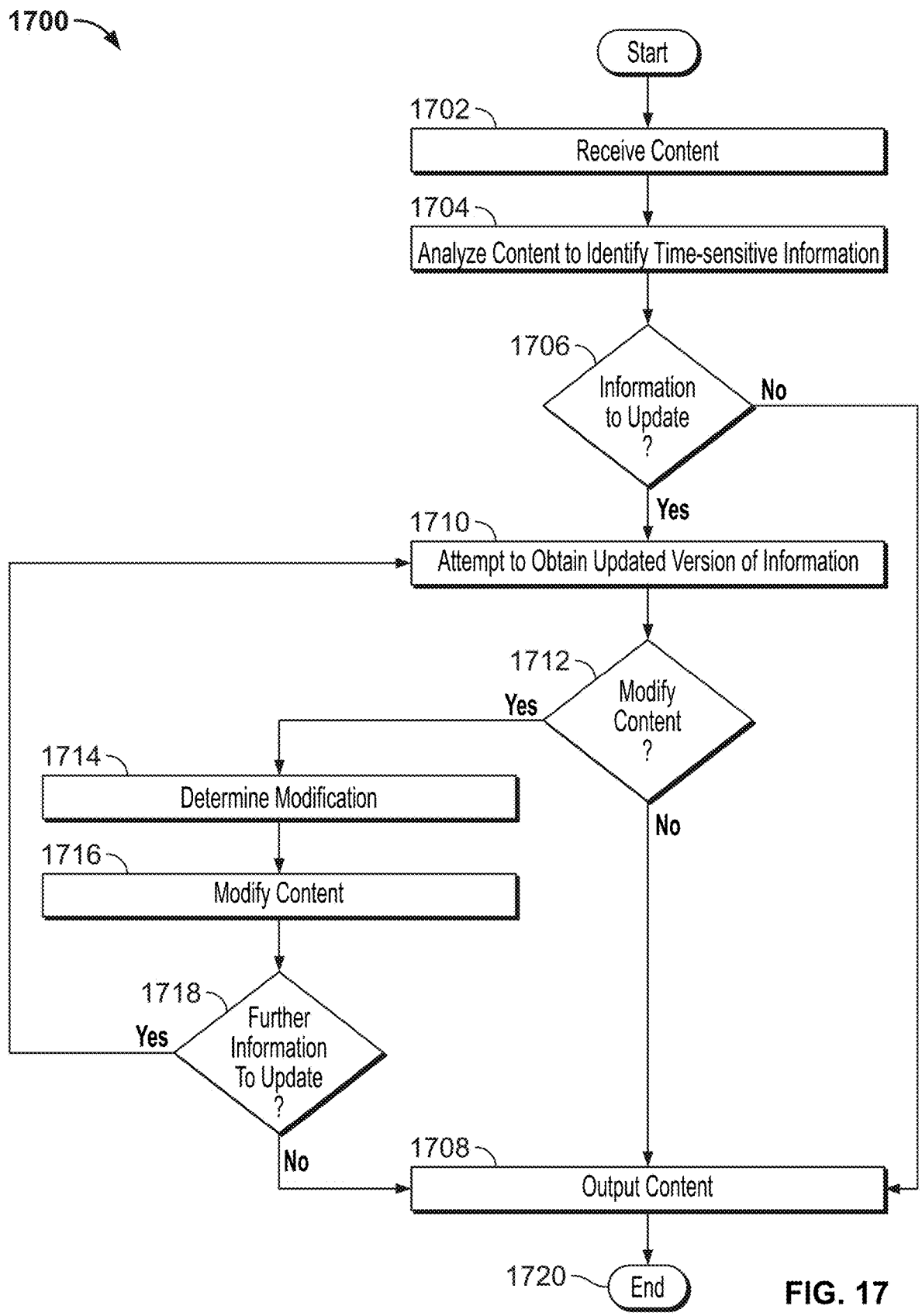
FIG. 17 is a flowchart of an example process for receiving content according to a further embodiment.

With reference to the scenario shown in FIG. 1, FIG. 17 is a flowchart of a process in which content is modified by a user equipment device 102b when it receives or accesses content forwarded from user equipment 102a, so that user 100b consumes modified content 104''', in place of original content 104. If the user 100b then forwards the content to other users 100d, 100e, the process of FIG. 10 may be used to make further modifications to the content, so that modified content 104' is forwarded. Alternatively, the modified content 104''' produced when the user equipment device 102b received or accessed the forwarded content 104 may be forwarded to users 100d, 100e without further modification by the user equipment device 102b.

Starting at step 1700, the content 104 is received by the user equipment device 102b which, in this example, is a smartphone 800.

The control circuitry 804 analyzes to identify time-sensitive information (step 1704) and determines whether there is information to be updated (step 1706), as described above in relation to steps 1004, 1006 of FIG. 10. However, because the process is being performed by the user equipment device 102b that has received the content 104, then the determination as to whether there is information to update may further include consideration of the circumstances and preferences of the user 100b. In this particular example, the content 104 includes a weather forecast 108 for Los Angeles that is outdated. The user equipment device 102b determines that the weather forecast 108 should be updated with a current weather forecast pertaining to a current time and a current location of the user equipment device 102b.

If it is determined that there is no information to update (step 1706), then the control circuitry outputs the content (step 1708). The content may be output for presentation, if the user 100b has instructed the user equipment device 102b to do so, or for storage until an instruction to present the content is received.

If it is determined that there is information to be updated (step 1706), then the control circuitry 804 attempts to obtain updated information (step 1710), as described above in relation to step 1010. In this particular example, the user equipment device 102b is in Seattle, and so attempts to obtain local weather information for the Seattle area. Such weather information may already be accessible to the user equipment device 102b, 800, for example, via a weather information application implemented on the user equipment device 102b, 800. Such an application may be a source that is associated with a level of confidence that exceeds a predetermined level of confidence used to determine whether or not to modify the content 104.

The control circuitry 804 then determines whether to modify the content (step 1712), in a similar manner to that described above in relation to step 1012 of FIG. 10. In this particular example, where the local weather information for Seattle has been obtained via a weather information application implemented on the user equipment device 102*b*, the local weather information may be associated with a high level of confidence, exceeding a predetermined level of confidence, due to it being a type of information that can be accurately updated and/or the source of the information being a trusted source. Therefore, the control circuitry 804 may determine that the weather forecast 108 in the content 104 can be replaced with the local weather information.

Figure 18:
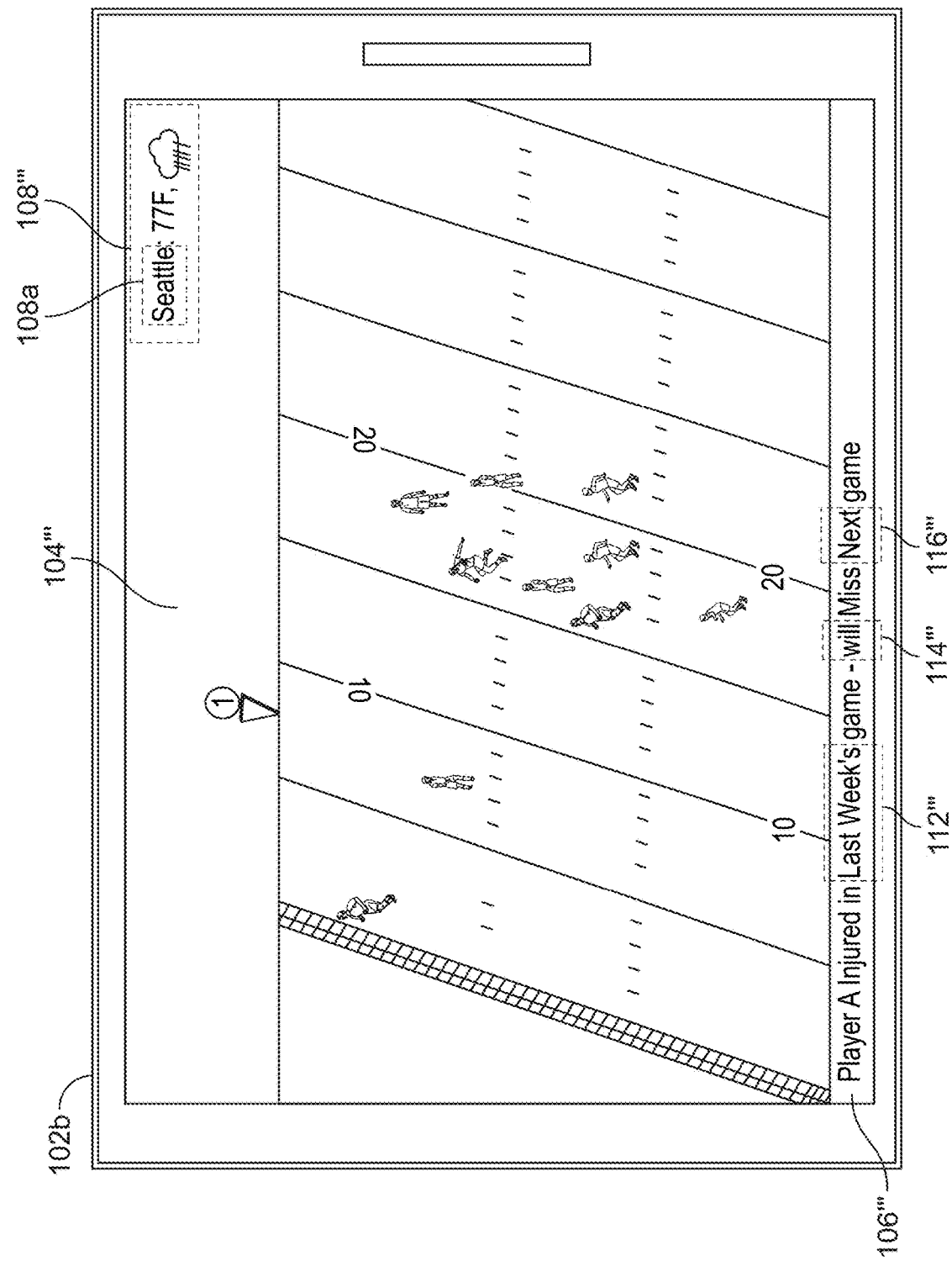
FIG. 18 depicts a display of an example of a modified version of the content in the method of FIG. 17.

At step 1716, the control circuitry 804 makes the determined modification to the content 104, producing modified content 104'''. FIG. 18 depicts an example of such modified content 104''', which includes an updated weather forecast 108''' including both updated weather information and an updated location 108*a*.

At step 1718, the control circuitry 804 determines whether there is further information to be updated in the modified content 104'''. If so, then steps 1710-1716 are repeated. In this particular example, the banner 106 also includes time-sensitive information. After steps 1710-1716 are repeated, the modified content 104''' includes a modified banner 106''', including modified wording 112''', 114''', 116''' as shown in FIG. 18.

If control circuitry 804 determines that no further updates to the information are needed (step 1718), then the modified content 104''' is output for presentation or storage at step 1708, and the process ends (step 1720).

While FIG. 17 has been described with reference to an example in which the user equipment device 102*b* performs the process, the process of FIG. 17 may be performed by any of the user equipment devices 102*a-g*, 202*a-g*, 302*a-g*, and/or by a remote server, e.g., messaging/chat service server 704, or social media platform server 706. The process of FIG. 17 may be performed instead of, or as well as, the process of FIG. 10. In other words, if user 100*a* forwards content 104 to user 100*b*, the content 104 may be modified at any one or more of the user equipment device 102*a*, or a remote server, when forwarding the content, the user equipment device 102*b* when receiving the content, or the user equipment device 102*b* when the user 100*b* accesses the content 104 for consumption.

It is contemplated that the steps or descriptions of the figures may be used with any other embodiment of this disclosure. In addition, the steps and descriptions described in relation to FIGS. 10, 15, 16 and 17 may be done in alternative orders or in parallel to further the purposes of this disclosure. Any of these steps may also be skipped or omitted from the process. Furthermore, it should be noted that the process description in relation to FIGS. 10 and/or 17 may be performed by any of the user equipment devices, a combination of one of the user equipment devices and a remote server, or by a remote server such as a server 704, 706 providing access to a social media platform or to a messaging or chat service through which the content is forwarded or otherwise made available. In addition, a process such as that shown in FIG. 10 or 17 may be performed by a user equipment device to modify content accessed from a webpage, blog post, or social media post.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present disclosure includes, at least, the following:

1. A method comprising:
   accessing, using control circuitry, static media content;
   identifying, using the control circuitry, time-sensitive information included in the content;
   determining, using the control circuitry, that an updated version of the time-sensitive information is available;
   in response to determining that the updated version is available, determining, using the control circuitry, whether to modify the content automatically, based on the updated version; and modifying, using the control circuitry, the content by adding one or more indications of the updated version, in response to determining that the content is to be modified automatically.

2. The method of item 1, wherein adding the one or more indications of the updated version includes replacing at least a portion of the time-sensitive information with the updated version.

3. The method of item 1 or 2, further comprising:
   determining, using the control circuitry, a level of confidence associated with the updated version; and
   determining, using the control circuitry, a modification to be made to the time-sensitive information based on the level of confidence.

4. The method of item 3, wherein:
   obtaining the updated version comprises retrieving the updated version from a content source; and
   the level of confidence is determined based on a reliability score associated with the content source.

5. The method of item 1, 2 or 3, wherein modifying the content comprises removing at least a portion of the time-sensitive information.

6. The method of any of items 1-5, comprising including the modified content in one of:
   a messaging service message;
   an e-mail;
   a post on a social media platform;
   a blog post; or
   a webpage.

7. The method of any of items 1-6, further comprising:
   determining a time period that has elapsed since the communication including the content was sent to a user equipment device; and
   determining whether the time period exceeds a predetermined time period;
   wherein determining whether to modify the content automatically is further based on the determination of whether the time period exceeds the predetermined time period.

8. The method of any of items 1-7, further comprising:
sending a communication including either:
the modified content;
the modified content and the unmodified content.
9. The method of any of items 1-8, further comprising:
forwarding the modified content;
receiving feedback indicating the reliability of the modified content; and
updating, based on the received feedback, a model used to determine whether the time-sensitive information is to be updated automatically and/or a model used to determine a modification to be made to the content.
10. The method of any of items 1-9, wherein modifying the content comprises modifying at least one of:
text data;
audio data;
image data; or
video data.
11. A non-transitory computer-readable medium on which is stored:
computer-readable instructions for accessing static media content;
computer-readable instructions for identifying time-sensitive information included in the content;
computer-readable instructions for determining that an updated version of the time-sensitive information is available;
computer-readable instructions for, in response to determining that the updated version is available, determining whether to modify the content automatically based on the updated version; and
computer-readable instructions for, in response to determining that the content is to be modified automatically, modifying the content by adding one or more indications of the updated version.
12. The non-transitory computer-readable medium of item 11, wherein the instructions for modifying the content include instructions for replacing at least a portion of the time-sensitive information with the updated version.
13. The non-transitory computer-readable medium of item 11, on which is stored:
computer-readable instructions for determining a level of confidence associated with the updated version; and
computer-readable instructions for determining a modification to be made to the time-sensitive information based on the level of confidence.
14. The non-transitory computer-readable medium of item 13, wherein:
the instructions for obtaining the updated version comprise instructions for retrieving the updated version from a content source; and
the instructions for determining the level of confidence comprises instructions for determining the level of confidence based on a reliability score associated with the content source.
15. The non-transitory computer-readable medium of item 11, wherein the instructions for modifying the content comprise instructions for removing at least a portion of the time-sensitive information.
16. The non-transitory computer-readable medium of item 11, on which is stored computer-readable instructions for including the modified content in one of:
a messaging service message;
an e-mail;
a post on a social media platform;
a blog post; or
a webpage.
17. The non-transitory computer-readable medium of item 11, on which is stored:
computer-readable instructions for determining a time period that has elapsed since the communication including the content was sent to a user equipment device; and
computer-readable instructions for determining whether the time period exceeds a predetermined time period;
wherein the instructions for determining whether to modify the content automatically comprise instructions for determining to not modify the content automatically based on a determination that the time period does not exceed the predetermined time period.
18. The non-transitory computer-readable medium of item 11, on which is stored:
computer-readable instructions for sending a communication including either:
the modified content;
the modified content and the unmodified content.
19. The non-transitory computer-readable medium of item 11, on which is stored:
computer-readable instructions for forwarding the modified content;
computer-readable instructions for receiving feedback indicating the reliability of the modified content; and
computer-readable instructions for updating, based on the received feedback, a model used to determine whether the time-sensitive information is to be updated automatically and/or a model used to determine a modification to be made to the content.
20. The non-transitory computer-readable medium of item 11, wherein the instructions for modifying the content comprise instructions for modifying at least one of:
text data;
audio data;
image data; or
video data.
21. An apparatus comprising:
control circuitry configured to:
access static media content;
identify time-sensitive information included in the content;
determine that an updated version of the time-sensitive information is available;
in response to determining that the updated version is available, determine whether to modify the content automatically, based on the updated version; and
in response to determining that the content is to be modified automatically, modify the content by adding one or more indications of the updated version.
22. The apparatus of item 21, wherein the control circuitry is configured to add one or more indications of the updated version to the static content by replacing at least a portion of the time-sensitive information with the updated version.
23. The apparatus of item 21, wherein the control circuitry is further configured to:
determine a level of confidence associated with the updated version; and determine a modification to be made to the content based on the level of confidence.
24. The apparatus of item 21, wherein the control circuitry is configured to:
retrieve the updated version from a content source; and
determine the level of confidence based on a reliability score associated with the content source.
25. The apparatus of item 21, wherein the control circuitry is configured to modify the content by removing at least a portion of the time-sensitive information.
26. The apparatus of item 21, wherein the control circuitry is configured to include the modified content in one of:
a messaging service message;
an e-mail;
a post on a social media platform;
a blog post; or
a webpage.
27. The apparatus of item 21, wherein the control circuitry is further configured to:
determine a time period that has elapsed since the communication including the content was sent to a user equipment device that comprises the control circuitry;
determine whether the time period exceeds a predetermined time period; and
based on a determination that the time period does not exceed the predetermined time period, determine not to modify the content automatically.
28. The apparatus of item 21, wherein the control circuitry is further configured to:
send a communication including either:
the modified content; or
the modified content and the unmodified content.
29. The apparatus of item 21, wherein the control circuitry is further configured to:
forward the modified content;
receive feedback indicating the reliability of the modified content; and
update, based on the received feedback, a model used to determine whether content is to be modified automatically and/or a model used to determine a modification to be made to the content.
30. The apparatus of item 21, wherein the control circuitry is configured to modify the content by modifying at least one of:
text data;
audio data;
image data; or
video data.
31. An apparatus comprising:
means for accessing static media content;
means for identify time-sensitive information included in the content;
means for determining that an updated version of the time-sensitive information is available;
means for, in response to determining that the updated version is available, determining whether to modify the content automatically, based on the updated version; and
means for, in response to determining that the content is to be modified automatically, modifying the content by adding one or more indications of the updated version.
32. The apparatus of item 31, wherein the means for modifying is configured to replace at least a portion of the time-sensitive information with the updated version.
33. The apparatus of item 31 or 32, comprising:
means for determining a level of confidence associated with the updated version; and
means for determining a modification to be made to the content based on the level of confidence.
34. The apparatus of any of items 31-33, comprising:
means for retrieving the updated version from a content source; and
means for determining the level of confidence based on a reliability score associated with the content source.
35. The apparatus of any of items 31-34, comprising means for including the modified content in one of:
a messaging service message;
an e-mail;
a post on a social media platform;
a blog post; or
a webpage.
36. The apparatus of any of items 31-35, wherein the means for modifying comprises means for removing at least a portion of the time-sensitive information.
37. The apparatus of any of items 31-36, comprising:
means for determining a time period that has elapsed since the communication including the content was sent to a user equipment device that comprises the control circuitry; and
means for determining whether the time period exceeds a predetermined time period;
wherein the means for determining whether to modify the content automatically is configured to determine not to modify the content based on a determination that the time period does not exceed the predetermined time period.
38. The apparatus of any of items 31-37, comprising:
means for sending a communication including either:
the modified content; or
the modified content and the unmodified content.
39. The apparatus of item 37, comprising:
means for receiving feedback indicating the reliability of the modified content; and
means for updating, based on the received feedback, a model used to determine whether content is to be modified automatically and/or a model used to determine a modification to be made to the content.
40. The apparatus of any of items 31-39, wherein the means for modifying is configured to modify at least one of:
text data;
audio data;
image data; or
video data.

What is claimed is:
1. A method comprising:
accessing, using control circuitry, a video content item;
analyzing, using the control circuitry, at least one frame of the video content item to identify text presented within the video content item and to determine whether the text includes time-sensitive information;
identifying, using the control circuitry, a cut-off time after which at least a portion of the text comprising the time-sensitive information ceases to be up-to-date relative to subject matter of the video content item as caused at least in part by a time of access of the video content item;
determining, using the control circuitry, that the identified cut-off time has been reached;
determining, using the control circuitry, an update of the text based at least in part on temporally new informa- tion available from a fact-checking service that verifies context of the time-sensitive information based on one or more of temporally current statistics or temporally current facts that characterize subject matter of the video content item relative to the time of access of the video content item;

automatically modifying without user input, using the control circuitry, the video content item based on the update of the text; and providing for display, using the control circuitry, the modified video content item.

2. The method of claim 1, wherein comprising:
obtaining the update of the text from a content source associated with the fact-checking service; and
determining a level of confidence associated with the update of the text based on a reliability score associated with the content source as processed by the fact-checking service.

3. The method of claim 1, wherein the modifying of the video content item comprises removing at least a portion of the text including the time-sensitive information.

4. The method of claim 1, comprising including the modified video content item in at least one of:
a messaging service message;
an e-mail;
a post on a social media platform;
a blog post; or
a webpage.

5. The method of claim 1, comprising:
sending, to one or more devices of one or more users, a communication including either:
the modified video content item; or
the modified video content item and an unmodified video content item.

6. The method of claim 1, wherein identifying the cut-off time comprises analyzing the text including the time-sensitive information to determine a period of validity of the text including the time-sensitive information.

7. The method of claim 1, wherein:
the video content item is generated based on one or more of a transmission of a live event broadcast or a live sports-related video, and
the text including the time-sensitive information is sports-related text including time-sensitive sports-related information.

8. The method of claim 1, wherein:
the video content item is related to at least one of news, weather, or share price, and
the text including the time-sensitive information is related to the at least one of news, weather, or share price.

9. The method of claim 1, wherein the determining, using the control circuitry, the update of the text occurs without user input.

10. The method of claim 1, further comprising:
sending a query to a fact-checking service server of the fact-checking service to obtain the update of the text, wherein the update of the text comprises quantitative information comprising at least one of sports scores, share prices, or other statistics.

11. The method of claim 1, further comprising:
sending a query to a fact-checking service server of the fact-checking service to obtain the update of the text, wherein the update of the text comprises includes qualitative information comprising statements or wording in a banner.

12. The method of claim 1, further comprising:
determining a level of confidence associated with the update of the text, wherein the level of confidence is based at least in part on whether a content source associated with the fact-checking service is an official information service or an official website.

13. The method of claim 1, further comprising:
determining a level of confidence associated with the update of the text, wherein the level of confidence is based at least in part on whether a content source associated with the fact-checking service is an official information service or an official website compared to fan websites, crowdsourced information repositories, or social media posts.

14. A method comprising:
accessing, using control circuitry, a video content item;
analyzing, using the control circuitry, at least one frame of the video content item to identify text presented within the video content item and to determine whether the text includes time-sensitive information;
identifying, using the control circuitry, a cut-off time after which at least a portion of the the text comprising the time-sensitive information ceases to be up-to-date relative to subject matter of the video content item as caused at least in part by a time of access of the video content item;
determining, using the control circuitry, that the identified cut-off time has been reached;
determining, using the control circuitry, an update of the text based at least in part on temporally new information available from a fact-checking service that verifies context of the time-sensitive information based on one or more of temporally current statistics or temporally current facts that characterize subject matter of the video content item relative to the time of access of the video content item;
determining, using the control circuitry, whether to modify the video content item automatically without user input based on the update of the text;
forwarding the modified video content item;
receiving feedback indicating a reliability of the modified video content item;
updating, based on the received feedback, a model used to determine whether the text is to be updated automatically and/or a model used to determine a modification to be made to the video content item;
automatically modifying without user input, using the control circuitry, the video content item based on the update of the text; and
providing for display, using the control circuitry, the modified video content item.

15. The method of claim 1,
wherein the identifying the cut-off time after which the text including the time-sensitive information ceases to be up-to-date, and the determining that the identified cut-off time has been reached includes:
determining a time period that has elapsed since a communication including the video content item was sent to a user equipment device; and
determining whether the time period exceeds a predetermined time period,
wherein the determining whether to modify the video content item automatically is based on the determination of whether the time period exceeds the predetermined time period.

16. An apparatus comprising:
a communication port;
a memory storing instructions; and
control circuitry communicably coupled to the memory and the communication port and configured to execute the instructions to:
 access a video content item;
 analyze at least one frame of the video content item to identify text presented within the video content item and to determine whether the text includes time-sensitive information;
 identify a cut-off time after which at least a portion of the text comprising the time-sensitive information ceases to be up-to-date relative to subject matter of the video content item as caused at least in part by a time of access of the video content item;
 determine that the identified cut-off time has been reached;
 determine an update of the text based at least in part on temporally new information available from a fact-checking service that verifies context of the time-sensitive information based on one or more of temporally current statistics or temporally current facts that characterize subject matter of the video content item relative to the time of access of the video content item;
 automatically modify without user input the video content item based on the update of the text; and
 provide for display the modified video content item.

17. The apparatus of claim 16, wherein the control circuitry is configured to:
 obtain the update of the text from a content source associated with the fact-checking service; and
 determine a level of confidence associated with the update of the text based on a reliability score associated with the content source as processed by the fact-checking service.

18. The apparatus of claim 16, wherein the control circuitry configured to modify the video content item comprises removing at least a portion of the text including the time-sensitive information.

19. The apparatus of claim 16, wherein the control circuitry configured to identify the cut-off time after which the text including the time-sensitive information ceases to be up-to-date, and determine that the identified cut-off time has been reached is configured to:
 determine a time period that has elapsed since a communication including the video content item was sent to a user equipment device; and
 determine whether the time period exceeds a predetermined time period,
 wherein the determining whether to modify the video content item automatically is based on the determination of whether the time period exceeds the predetermined time period.

20. The apparatus of claim 16, wherein the control circuitry is configured to:
 send, to one or more devices of one or more users, a communication including either:
  the modified video content item; or
  the modified video content item and an unmodified video content item.

21. The apparatus of claim 16, wherein the control circuitry is configured to:
 forward the modified video content item;
 receive feedback indicating a reliability of the modified video content item; and
 update, based on the received feedback, a model used to determine whether the text is to be modified automatically and/or a model used to determine a modification to be made to the video content item.

22. The apparatus of claim 16, wherein the control circuitry is configured to modify the video content item by modifying at least one of:
 text data;
 audio data;
 image data; or
 video data.

* * * * *

UNITED STATES PATENT AND TRADEMARK OFFICE
CERTIFICATE OF CORRECTION

Page 1 of 1

PATENT NO. : 12,412,026 B2
APPLICATION NO. : 17/391548
DATED : September 9, 2025
INVENTOR(S) : Vikram Makam Gupta et al.

It is certified that error appears in the above-identified patent and that said Letters Patent is hereby corrected as shown below:

In the Claims

Claim 14, Column 24, Line 23, delete "the the" and replace with --the--

Signed and Sealed this
Twenty-first Day of October, 2025

John A. Squires
*Director of the United States Patent and Trademark Office*